US006467326B1

(12) United States Patent
Garrigus

(10) Patent No.: US 6,467,326 B1
(45) Date of Patent: Oct. 22, 2002

(54) METHOD OF RIVETING

(75) Inventor: Darryl F. Garrigus, Issaquah, WA (US)

(73) Assignee: The Boeing Company, Seattle, WA (US)

( * ) Notice: Subject to any disclaimer, the term of this patent is extended or adjusted under 35 U.S.C. 154(b) by 210 days.

(21) Appl. No.: 09/698,996

(22) Filed: Oct. 27, 2000

Related U.S. Application Data

(62) Division of application No. 09/335,233, filed on Jun. 17, 1999, now abandoned, which is a division of application No. 09/123,936, filed on Jul. 27, 1998
(60) Provisional application No. 60/080,966, filed on Apr. 7, 1998.

(51) Int. Cl.[7] .......................... B21J 7/20; H02K 33/00
(52) U.S. Cl. .......................... 72/430; 72/56; 29/243.53; 219/491
(58) Field of Search ....................... 72/56, 456, 453.15, 72/253, 430, 54, 707; 29/243–253; 219/491, 499, 501, 619

(56) References Cited

U.S. PATENT DOCUMENTS

| | | | |
|---|---|---|---|
| 3,704,506 A | 12/1972 | Orr et al. | |
| 3,836,827 A | 9/1974 | Cuthbertson | |
| 3,920,956 A | 11/1975 | Endo et al. | |
| 4,128,000 A | 12/1978 | Hogenhout et al. | |
| 4,146,858 A | 3/1979 | McDermott | |
| 4,150,786 A | 4/1979 | Sable | |
| 4,151,735 A | 5/1979 | McDermott | |
| 4,256,945 A | 3/1981 | Carter et al. | |
| 4,420,876 A | 12/1983 | McDermott | |
| 4,459,248 A | 7/1984 | Sagawa et al. | |
| 4,481,709 A | 11/1984 | McDermott | |
| 4,499,355 A | 2/1985 | Walter | |
| 4,515,302 A | 5/1985 | Davern et al. | |
| 4,516,104 A | 5/1985 | McDermott | |
| 4,543,555 A | 9/1985 | McDermott | |
| 4,610,142 A | 9/1986 | Davis | |
| 4,795,886 A | 1/1989 | Carter, Jr. | |
| 4,862,043 A | 8/1989 | Zieve | |
| 4,881,984 A | * 11/1989 | Chandhok et al. | 72/253.1 |

(List continued on next page.)

*Primary Examiner*—David Jones
(74) *Attorney, Agent, or Firm*—John C. Hammar

(57) ABSTRACT

Rare earth metal switched magnetic devices that comprise one or more magnets, a rare earth metal element positioned in the magnetic field produced by the magnet(s) and a system for controlling the temperature of the rare earth metal element are disclosed. The rare earth metal element is formed of a rare earth metal or rare earth metal alloy having magnetic properties that change from ferromagnetic to paramagnetic when heated above the Curie temperature of the chosen rare earth metal or rare earth metal alloy. Preferably the Curie temperature of the chosen rare earth metal or rare earth metal alloy is at or below the ambient temperature in which the rare earth metal switched magnetic device is to be used—approximately room temperature (70° F.) in the case of devices intended for use in a factory. Tailored Curie temperatures can be obtained by alloying rare earth metals together and/or with conventional switchable "soft" magnetic metals—iron, nickel, and cobalt. Three suitable rare earth metals are gadolinium, terbium, and dysprosium. Switching is produced by controlling the temperature of the rare earth metal element. When the temperature of the rare earth metal element is reduced below the Curie temperature of the rare earth metal or rare earth metal alloy, the ferromagnetic properties of the rare earth metal element cause the element to interact with the magnetic field produced by the magnet(s). When the temperature of the rare earth metal element is raised above the Curie temperature of the rare earth metal or rare earth metal alloy, the loss of ferromagnetism substantially reduces, if not entirely eliminates, the interaction between the rare earth metal element and the magnetic field produced by the magnet(s). Disclosed are clamps, lifters, riveters, valves, and actuators.

3 Claims, 11 Drawing Sheets

U.S. PATENT DOCUMENTS

| | | | | | |
|---|---|---|---|---|---|
| 4,908,928 | A | | 3/1990 | Mazurik et al. | |
| 4,915,891 | A | * | 4/1990 | Chandhok et al. | 72/253.1 |
| RE33,644 | E | | 7/1991 | Hall | |
| 5,111,440 | A | | 5/1992 | Mathildus et al. | |
| 5,252,941 | A | | 10/1993 | Pitzele et al. | |
| 5,345,161 | A | | 9/1994 | Zieve | |
| 5,398,537 | A | * | 3/1995 | Michalewski et al. | 72/430 |
| 5,404,633 | A | | 4/1995 | Givler | |
| 5,407,003 | A | | 4/1995 | Givler et al. | |
| 5,443,664 | A | | 8/1995 | Nakajima et al. | |
| 5,471,865 | A | * | 12/1995 | Michalewski et al. | 72/430 |
| 5,552,582 | A | | 9/1996 | Abe et al. | |
| 5,553,478 | A | * | 9/1996 | Di Troia | 72/453.15 |
| 5,575,166 | A | * | 11/1996 | Michalewski et al. | 72/56 |
| 5,748,064 | A | | 5/1998 | Smeenge et al. | |
| 5,844,212 | A | | 12/1998 | Dickens et al. | |
| 6,180,928 | B1 | * | 1/2001 | Garrigus | 72/56 |
| 6,184,503 | B1 | * | 2/2001 | Garrigus | 72/456 |

* cited by examiner

*Fig. 10A*
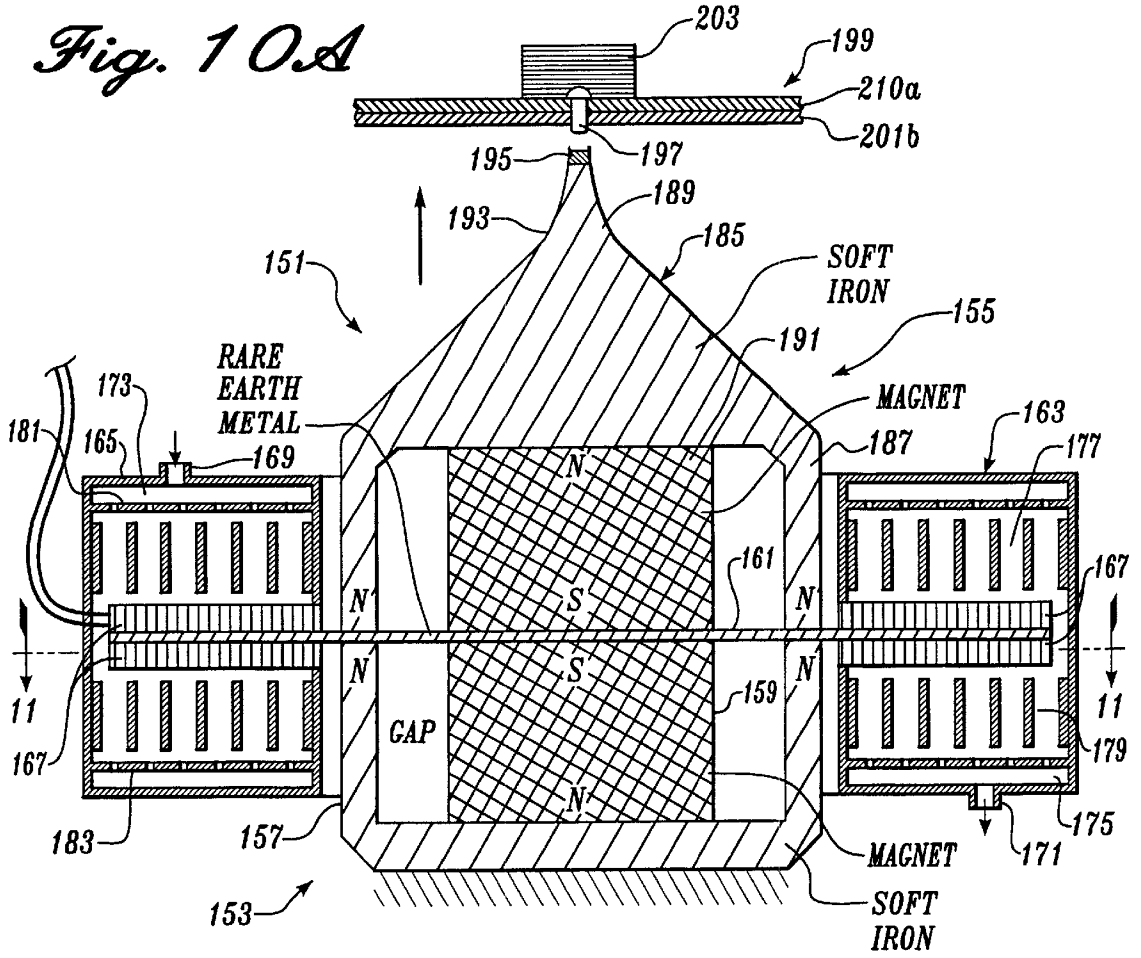
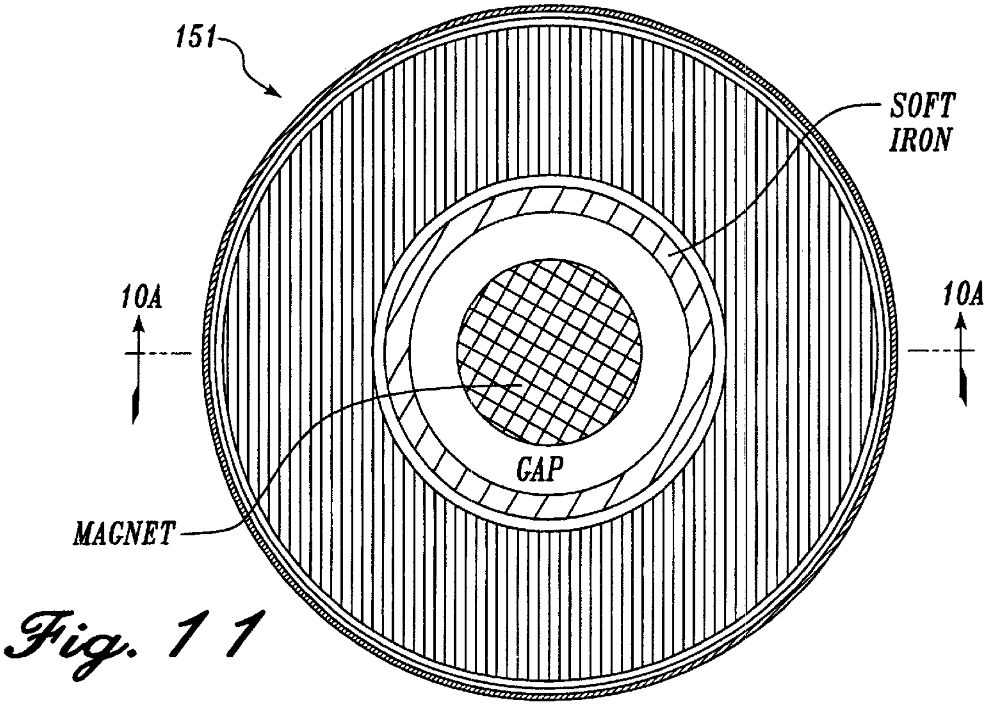
*Fig. 11*

*Fig. 10B*
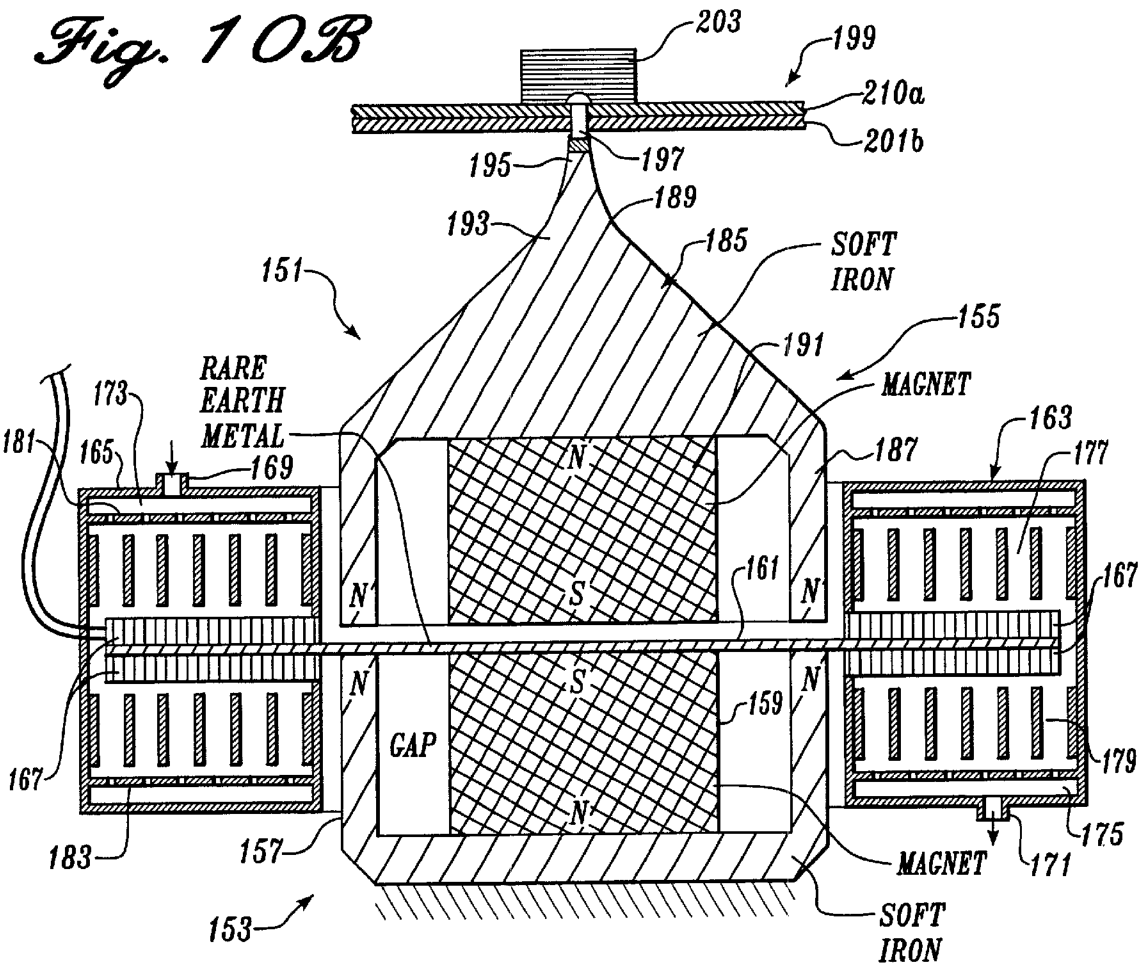
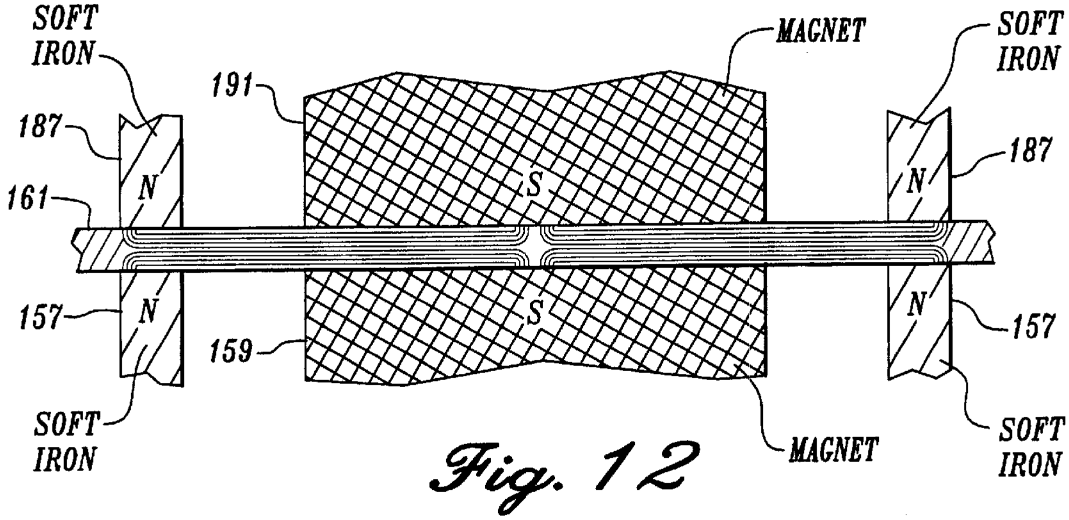
*Fig. 12*

METHOD OF RIVETING

RELATED APPLICATION

This application claims the benefit of the filing date of U.S. Provisional Application Ser. No. 60/080,966, filed Apr. 7, 1998, which is a divisional application based upon U.S. patent application Ser. No. 09/335,233, filed Jun. 17, 1999 now abandoned, which was a divisional application based upon U.S. patent application Ser. No. 09/123,936, filed Jul. 27, 1998.

FIELD OF THE INVENTION

This invention relates to magnetic riveters and their method of operation, particularly using a rare earth metal element to capture the magnetic flux to control the upset force.

BACKGROUND OF THE INVENTION

In the past, both permanent and electromagnets have been employed in a variety of devices used in factories and other environments. Devices that require magnetic energy to be switched on and off generally employ electromagnets because the magnetic field produced by permanent magnets cannot be switched on and off As a result, lifting devices, clamping devices, and other devices that require large magnetic forces to attract or in some other manner selectively interact with a ferromagnetic element employ electromagnets. As a general rule, permanent magnets are not employed in detachable magnetic devices, e.g., lifters and clamps, that require large magnetic forces because of the difficulty in detaching such devices, i.e., removing a lifter from a ferromagnetic part or separating the two elements of a magnetic clamp. Also, as a general rule, permanent magnets have not been used in high force generating devices that employ magnetic energy, such as riveters, because of the difficulty in controlling the interaction of the magnetic field with another element, e.g., the hammer of a riveter. As a result, contemporary riveters that employ magnetic energy are electromagnetic in nature.

While electromagnets are usable in factories and many other environments, they have a number of disadvantages in some environments. For example, electromagnets are undesirable in environments where potentially explosive gases are present because of the possibility that an arc will occur and ignite the explosive gases. Further, high-power electromagnets designed for use in factories require high voltage and/or large current sources, which can be dangerous. Electromagnets also tend to be bulky due to their inclusion of a relatively large coil wrapped around a core, usually formed of a ferromagnetic material. Further, electromagnets may exhibit substantial residual amounts of magnetism even when switched off which may be undesirable in some environments.

While permanent magnets avoid some of the disadvantages of electromagnets, they have other disadvantages. As noted above, permanent magnets cannot be switched on and off. As a result, large mechanical forces are required to move strong permanent magnets toward or away from a part, or the part away from the magnet, in order to detach the permanent magnet from the part. The inability to switch permanent magnets on and off has, as noted above, severely restricted the use of such magnets, particularly high-power permanent magnets. Permanent magnets have not found use where high clamping or repulsive forces are required because of their inability to be turned on and off. As a general rule, electromagnets have generally been used in devices requiring switchable high magnetic clamping forces.

One exception is described in U.S. patent application Ser. No. 08/738, 993, and titled "High Temperature Superconductor Magnetic Clamps" by D. F. Garrigus et al. This patent application describes switchable magnetic clamps that incorporate superconductor magnets. The clamp is switched on and off by controlling temperature of the superconductor magnets. Because superconductor magnets become superconducting at extremely low temperatures, the magnetic clamps described in this patent application require a complex and, thus, expensive temperature control system.

The present invention is generally directed to providing switchable magnetic devices suitable for use in a factory or other environment where the ambient temperature is approximately room temperature (70° F.) that overcome the foregoing disadvantages. While directed to providing switchable permanent magnetic devices that have the capability of being switched on and off, the invention can also be used with electromagnets. As will be better understood from the following description, in addition to being usefully employed in lifters, clamps, and riveters, switchable magnetic devices formed in accordance with the invention can also be usefully employed in a variety of other devices. Further, while ideally suited for use in magnetic devices intended to operate in a room temperature environment, the invention can also be used in devices intended to operate in other, particularly low-temperature, environments, such as the environment in space.

SUMMARY OF THE INVENTION

In accordance with this invention, rare earth metal switched magnetic devices like a riveter include one or more magnets, a rare earth metal element positioned or positionable in the magnetic field produced by the magnet(s), and a system for controlling the temperature of the rare earth metal element are provided. The rare earth metal element is a switchable "soft" magnetic element that is partially or fully formed of a rare earth metal or rare earth metal alloy having magnetic properties that change from ferromagnetic to paramagnetic when heated above the Curie temperature of the chosen rare earth metal or rare earth metal alloy. Switching is produced by controlling the temperature of the rare earth metal element to transition the temperature of the rare earth metal element through the Curie temperature of the rare earth metal element. When the temperature of the element is reduced below the Curie temperature of the rare earth metal or rare earth metal alloy, the ferromagnetic properties of the rare earth metal element cause the element to interact with the magnetic field produced by the permanent magnet(s). When the temperature of the element is raised above the Curie temperature of the rare earth metal or rare earth metal alloy, the loss of ferromagnetic properties substantially reduces, if not entirely eliminates, the interaction between the rare earth metal element and the magnetic field produced by the magnet(s). While, preferably, the magnet(s) is a permanent magnet, the magnet(s) can be an electromagnet.

In accordance with other aspects of this invention, the Curie temperature of the rare earth metal element is approximately equal to or below ambient room temperature.

In accordance with further aspects of this invention, preferably, the rare earth metal is gadolinium, terbium, or dysprosium, or an alloy that includes gadolinium, terbium, and/or dysprosium.

In accordance with yet other aspects of this invention, the temperature of the rare earth metal element is controlled by creating a passageway in the rare earth metal plate, passing a liquid or gas through the passageway and controlling the temperature of the liquid or gas.

In accordance with alternate aspects of this invention, the temperature of the rare earth metal element is controlled by surrounding at least part of the rare earth metal element with a jacket, passing liquid or gas through the jacket, and controlling the temperature of the liquid or gas.

In accordance with other alternate aspects of this invention, the chosen rare earth metal or rare earth metal alloy has a relatively high electrical resistivity value and the temperature of the rare earth metal element is controlled by passing electrical current through the element, which causes the temperature of the element to rise above the Curie temperature of the rare earth metal or rare earth metal alloy.

In accordance with further alternative aspects of this invention, the temperature of the rare earth metal element is controlled by a Peltier heater/cooler that is mounted in heat conducting relationship with the rare earth metal element.

In accordance with yet still other aspects of this invention, the rare earth metal a preferred riveter includes support structure and a movable head. The rare earth metal element is a wall located between the support structure and the movable head. The support structure and the movable head each include magnets. The magnets are repulsively oriented. The thickness of the rare earth metal wall is such that when the temperature of the wall is below the Curie temperature of the rare earth metal or rare earth metal alloy forming the wall, the repulsive effect of the magnets is neutralized. When the temperature of the wall is raised above the Curie temperature, the magnets repel one another, causing the head of the riveter to rapidly move away from the support structure and upset a rivet.

In accordance with alternative aspects of this invention, only the support structure of the rare earth metal switched magnetic riveter includes a magnet. The movable head does not include a magnet. Rather, a coil spring surrounding the magnet is included in the support structure. The rare earth metal wall overlies the magnet and forms part of a movable head. When the temperature of the wall is below the Curie temperature of the rare earth metal or rare earth metal alloy forming the wall, the ferromagnetic properties of the wall cause the wall to be attracted to the magnet, compressing the coil spring. When the temperature of the wall is raised above the Curie temperature of the rare earth metal or rare earth metal alloy forming the wall, the loss of ferromagnetism allows the energy stored in the compressed spring to rapidly move the head of the riveter away from the support structure.

As will be readily appreciated from the foregoing description, the invention provides rare earth metal switched magnetic devices. A rare earth metal switched magnetic device formed in accordance with the invention includes one or more magnets, a rare earth metal element positioned in the magnetic field produced by the magnet(s), and a system for causing the temperature of the rare earth metal element to transition through the Curie temperature of the rare earth metal or rare earth metal alloy forming the rare earth metal element. This basic structure can be usefully employed in clamps, lifters, riveters, valves, actuators, and many other devices, all of which fall within the scope of the invention. While the invention was developed for use in creating devices designed for use in a factory, it is to be understood that the invention may also find use in devices intended to be used in other environments. In this regard, in order to avoid the need for insulation and other expensive components, the Curie temperature of the rare earth magnetic element should be tailored to the ambient temperature of the environment of use. This is readily done by the alloying of switchable "soft" magnetic materials, which include rare earth metals having a Curie temperature and other metals, namely, nickel, cobalt, and iron, which also have a Curie temperature.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 10A is a cross-sectional view of a rare earth metal switched magnetic riveter formed in accordance with the invention in the retracted position taken along line 10A—10A of FIG. 11;

FIG. 10B is a cross-sectional view of the rare earth metal switched magnetic riveter shown in FIG. 10A in the rivet upset position;

FIG. 11 is a cross-sectional view along line 11—11 of FIG. 10A;

FIG. 12 is an enlarged portion of a section of the rare earth metal switched magnetic riveter shown in FIGS. 10A, 10B and 11;

DETAILED DESCRIPTION OF THE PREFERRED EMBODIMENT

Figure 1:
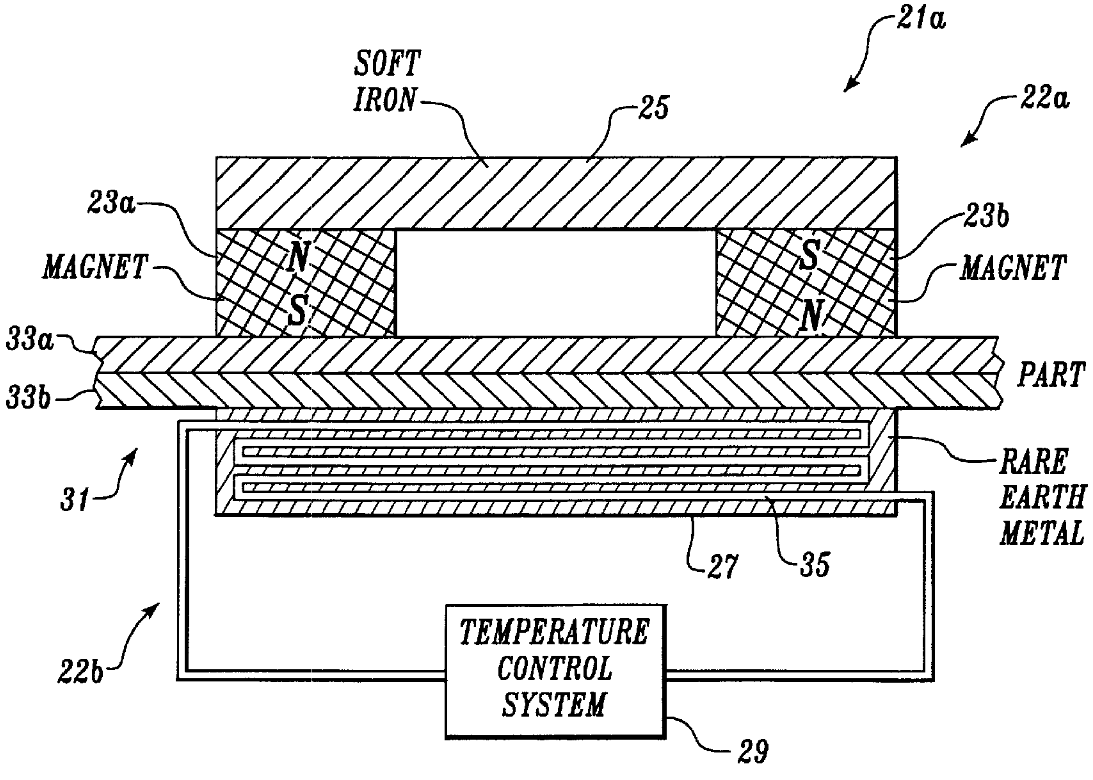
FIG. 1 is a cross-sectional view of a rare earth metal switched magnetic clamp formed in accordance with the invention.

As shall be better understood from the following description, rare earth metal switched magnetic devices formed in accordance with this invention employ rare earth metal elements to control the effect of the magnetic field produced by magnets, preferably high-intensity permanent magnets such as ceramic and rare earth magnets. The rare earth metal elements employed by rare earth metal switched magnetic devices formed in accordance with this invention are partially or fully formed of a rare earth metal or rare earth metal alloy having magnetic properties that change from ferromagnetic to paramagnetic when heated above the Curie temperature of the chose rare earth metal or rare earth metal alloy. While the preferred rare earth metals are gadolinium, terbium, and dysprosium and preferred rare earth metal alloys are alloys that include gadolinium, terbium, and/or dysprosium, other rare earth metals, or alloys thereof, can also be employed. Suitable Lanthanide or rare earth metals are set forth in the following table:

| Lanthanide | Maximum Magnetic Saturation (Tesla) | Curie Temperature (0° C.) |
|---|---|---|
| Gadolinium | 2.66 | 20 |
| Terbium | 3.41 | −53 |
| Dysprosium | 3.76 | −185 |
| Holmium | 3.87 | −254 |
| Erbium | 3.03 | −254 |
| Thulium | 2.77 | −241 |

For most applications, gadolinium or an alloy that includes gadolinium will be preferred because of cost and because the Curie temperature of gadolinium is near the ambient temperature in which many rare earth metal switched magnetic devices will be used. In this regard, as will be better understood from the following description, the invention was developed for inclusion in devices designed for use in factories or other environments where the ambient temperature is at or near room temperature (approximately 70° F.). As noted above, rare earth switched magnetic devices formed in accordance with the invention employ rare earth metal elements having Curie temperatures. As will be better understood from the following description, the temperature of rare earth metal elements employed by devices formed in accordance with the invention transitions above and below the Curie temperature of the rare earth metal elements. The temperature transition controls the ferromagnetic/paramagnetic state of the rare earth metal elements, which in turn controls operation of the rare earth switched magnetic devices. In order to avoid the need for insulation and/or excessive heating and cooling systems, it is desirable that the Curie temperature of the rare earth metal element be at or below the ambient temperature of the environment in which the rare earth metal switched device is to be used—approximately room temperature for devices designed to be used in a factory. In a factory environment, this allows readily available factory air or liquids to be used to control the temperature of the rare earth metal elements.

While gadolinium or an alloy that includes gadolinium is preferred in many devices because of the cost and because the Curie temperature of gadolinium is near room temperature, in some environments other rare earth metals may be preferred because of their higher magnetic saturation capabilities. Holmium, at almost 3.9 Tesla, has the advantage that it has over three times the energy density of iron. In this regard, the magnetic saturation of iron is 2.19 Tesla. The Curie temperature of iron is 770° C. The energy density of a magnetic element is proportional to the maximum magnetic saturation squared. Thus, the energy density for iron is approximately 4.80 (2.19 squared), whereas the energy density for holmium is approximately 15 (3.87 squared). Thus, as noted above, holmium has approximately three times the energy density of iron.

The Curie temperature of rare earth metal elements employed by the invention can be tailored to a specific temperature by alloying rare earth metals, which, except for gadolinium, have a Curie temperature well below room temperature, together and/or with more conventional switchable "soft" magnetic metals—nickel, cobalt, and iron—all of which have Curie temperatures well above room temperature. Such alloys roughly follow the "rule of mixtures" with respect to their Curie temperatures.

As will also be better appreciated from the following description, rare earth metal switched magnetic devices formed in accordance with this invention comprise one or more magnets (preferably permanent magnets), a rare earth metal element positioned in a magnetic field produced by the magnet(s) and a system for controlling the temperature of the rare earth metal element so that temperature of the rare earth metal element transitions through the Curie temperature of the rare earth metal element. More specifically, the system for controlling the temperature of the rare earth metal element causes the temperature of the rare earth metal element to either drop below the Curie temperature of the rare earth metal or rare earth metal alloy forming the rare earth metal element or raise above the Curie temperature. Below the Curie temperature, the ferromagnetic properties of the rare earth metal element causes the element to interact with the magnetic field produced by the magnet(s). Above the temperature Curie temperature the amount of interaction is substantially reduced if not entirely eliminated. As will be better understood from the following description, controlling the interaction between the rare earth metal element and the magnetic field produced by the magnet(s) allows the invention to be usefully employed in clamps, lifters, riveters, valves, actuators, and other mechanical devices.

FIG. 1 illustrates a rare earth metal switchable magnetic clamp 21*a* formed in accordance with the invention. The rare earth metal switchable magnetic clamp 21*a* includes a magnetic structure 22*a*and a backing plate assembly 22*b*. The magnetic structure 22*a*includes first and second permanent magnets 23*a* and 23*b* and a bridge 25. The backing plate assembly 22*b* includes a backing plate 27 and a temperature control system 29. The magnets 23*a* and 23*b* are permanent magnets, preferably high-energy permanent magnets, such as ceramic or rare earth metal magnets. The bridge 25 is formed of a ferromagnetic material, preferably soft iron.

The first and second permanent magnets 23*a* and 23*b* are located at opposite ends of the bridge 25. The first and second permanent magnets are oriented such that opposite poles of the permanent magnets are juxtaposed against the bridge 25. As shown, the north (N) pole of one permanent magnet 23*a* is juxtaposed against one end of the bridge 25, and the south (S) pole of the other permanent magnet 23*b* is juxtaposed against the other end of the iron bridge 25. As a result, magnetic structure 22*a* has a U-shape.

The backing plate 27 is formed of a rare earth metal or a rare earth metal alloy. The backing plate 27 includes an internal passageway 31 depicted as having a sinuous configuration. The ends of the passageway 31 are connected to the temperature control system 29. The temperature control system, which produces a temperature-controlled fluid or gas, includes a pump mechanism for causing the fluid or gas to flow through the passageway 31 formed in the rare earth metal backing plate 27. Located between the magnetic structure 23*a* and the backing plate 27 is a part 31 depicted as formed of two planar layers 33*a* and 33*b*. The layers 33*a* and 33*b* may be nonmetallic or formed of a nonferromagnetic metal, such as aluminum.

In operation, the temperature control system 29 controls the temperature of the backing plate 27. When the temperature of the backing plate 27 is above the Curie temperature of the rare earth metal or rare earth metal alloy forming the backing plate, the magnetic attraction between the magnetic structure 22*a* and the backing plate 27 is low because the ferromagnetic properties of the backing plate are low. When in this state, the magnetic structure 22*b* and the backing plate 27 are easily placed on opposite sides of the part 31, in alignment with one another as shown in FIG. 1. After being so positioned, the temperature control system 29 reduces the temperature of the backing plate 27 below the Curie temperature of the rare earth metal or rare earth metal alloy forming the backing plate 27. When this occurs, the backing plate becomes highly ferromagnetic, resulting in a strong magnetic attraction force being created between the magnetic structure 22*a* and the backing plate 27. As a result, the layers 33*a* and 33*b* of the part 31 are clamped together.

A magnetic clamping force is produced because when the temperature of the backing plate 27 is reduced below the Curie temperature of the rare earth metal or the rare earth metal alloy forming the backing plate, the backing plate becomes ferromagnetic and is thereby attracted the south (S) pole of one of the first magnets 23*a* and to the north (N) pole of the other permanent magnet 23*b*. The force is strong because of the high magnetic saturation properties possessed by certain rare earth metal and rare earth metal alloys, as described above, when the temperature of such metals and alloys are below their Curie temperature. The clamp 21*a* is released by the temperature control system 29 raising the temperature of the backing plate 27 above the Curie temperature of the rare earth metal or rare earth metal alloy forming the backing plate.

Figure 2:
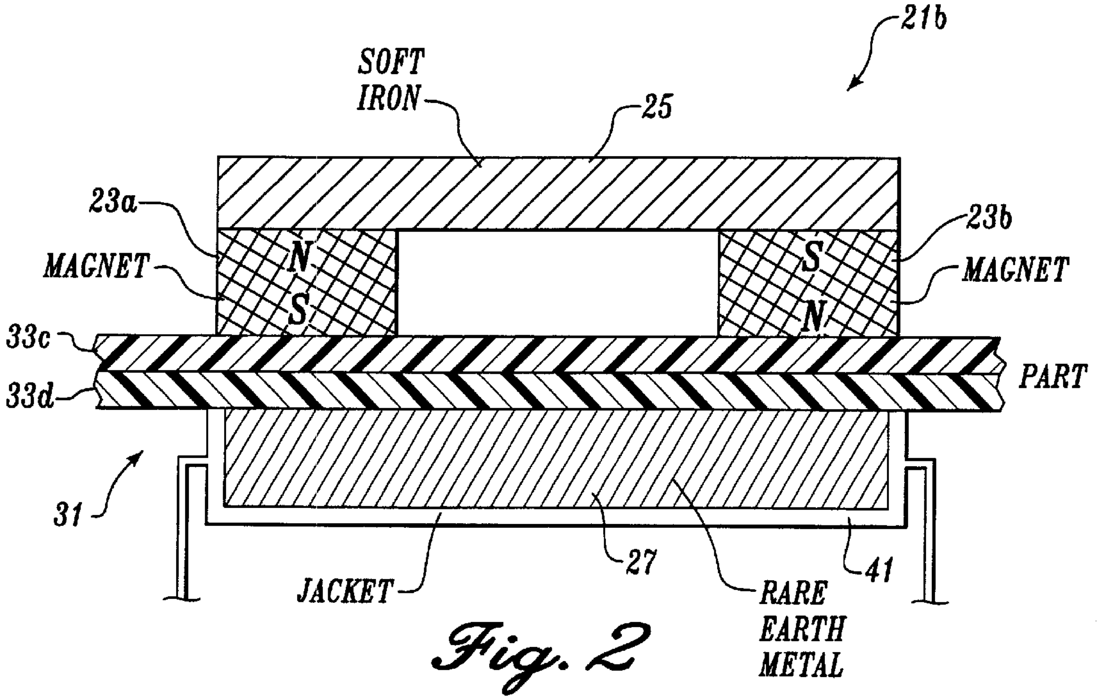
FIG. 2 is a cross-sectional view of an alternative embodiment of a rare earth metal switched magnetic clamp formed in accordance with the invention.

FIG. 2 illustrates an alternative embodiment of a rare earth metal switched magnetic clamp 21*b* formed in accordance with the invention. The only difference between the rare earth metal switched magnetic clamp shown in FIG. 2 and the rare earth metal switched magnetic clamp shown in FIG. 1 is that rather than the backing plate 27 including an interior passageway 35 through which a temperature-controlling gas or fluid passes, the passageway is replaced with a jacket 41 that encloses the sides of the backing plate 27 not juxtaposed against the part 31 being clamped. FIG. 2 also illustrates, by change in cross hatching, that the layers 33*c* and 33*d* forming the part 31 may be non-metallic as well as metallic as shown in FIG. 1.

Like the passageway 35 illustrated in FIG. 1, the jacket 41 illustrated in FIG. 2 is connected to a temperature control system (not shown in FIG. 2). The temperature control system provides a temperature-controlled gas or liquid that is used to control the temperature of the backing plate 27 and, thus, the ferromagnetic properties of the backing plate. As with the embodiment of the invention illustrated in FIG. 1 and described above, controlling the ferromagnetic properties of the backing plate 27 by raising and lowering the temperature of the backing plate above and below the Curie temperature of the rare earth metal or rare earth metal alloy used to form the backing plate 27 controls the magnetic force between the backing plate 27 and the magnetic structure formed by the first and second permanent magnets 23*a* and 23*b* and the bridge 25 and, thus, the force applied to the part 31.

Figure 3:
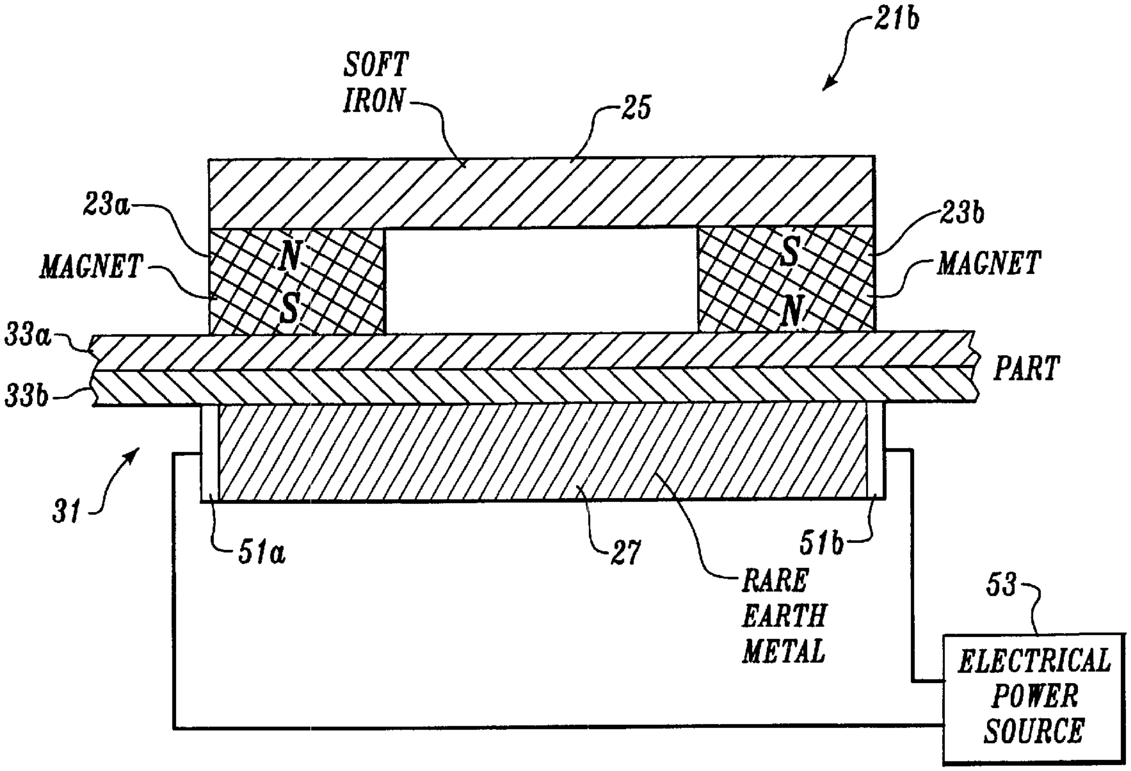
FIG. 3 is another alternative embodiment of a rare earth metal switched magnetic clamp formed in accordance with the invention.

FIG. 3 illustrates a further alternative embodiment of a rare earth metal switchable magnetic clamp 21*c* formed in accordance with the invention. The rare earth metal switchable magnetic clamp shown in FIG. 3 is generally similar to the rare earth metal switchable magnetic clamp 21*a* illustrated in FIG. 1 and the rare earth metal switchable magnetic clamp 21*b* illustrated in FIG. 2 and described above. The main difference between the rare earth metal switchable magnetic clamp 21*c* illustrated in FIG. 3 and the rare earth metal switchable magnetic clamps 21*a* and 21*b* illustrated in FIGS. 1 and 2 is in the mechanism for controlling the temperature of the backing plate 27. In the case of the rare earth metal switchable magnetic clamp shown in FIG. 3, the temperature control mechanism is electrical, rather than fluidic. More specifically, located on either end of the backing plate 27 of the rare earth metal switchable magnetic clamp 21*c* shown in FIG. 3 are electrical terminals 51*a* and 51*b*. The electrical terminals 51*a* and 51*b* are connected to a suitable controllable electrical power source 53. Obviously, the embodiment of the invention illustrated in FIG. 3 is only usable with backing plates 27 formed of rare earth metal or rare earth metal alloys having a resistivity value that is sufficient for heat to be generated when electric current passes through the backing plate 27. In this regard, by way of example only, the electrical conductivity of gadolinium is generally similar to that of nichrome, a widely used heating element. Clearly, the electrical power source cannot be used to reduce the temperature of the backing plate 27. It only is used to raise the temperature of the rare earth metal backing plate 27. The ambient temperature of the environment surrounding the backing plate is used to reduce the temperature of the backing plate.

In addition to using fluidic (FIGS. 1 and 2) or electrical (FIG. 3) systems to control the temperature of the backing plate 27, other systems of temperature control can be used. For example, the temperature of the rare earth metal backing plate 27 can be controlled by a Peltier heater/cooler of the type described below in connection with the rare earth metal switched magnetic devices shown in FIGS. 10A–12 and 16.

Figure 4:
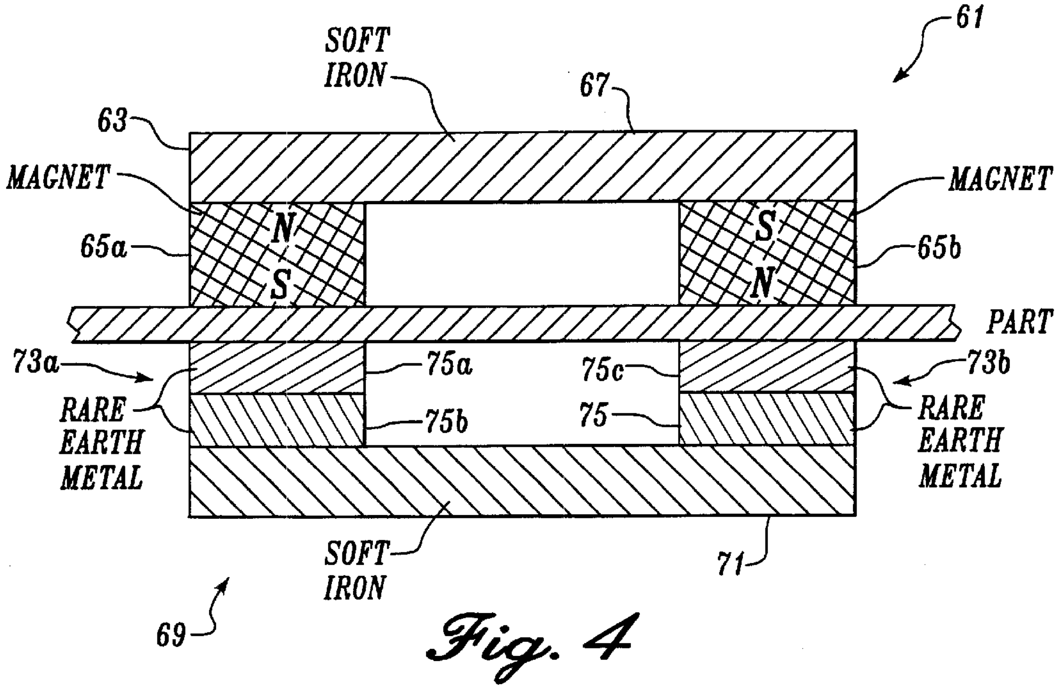
FIG. 4 is a further alternative embodiment of a rare earth metal switched magnetic clamp formed in accordance with the invention.

FIG. 4 illustrates another alternative embodiment of a rare earth metal switched magnetic clamp 61 formed in accordance with the invention. As with other rare earth metal switch magnetic clamps and lifters depicted in FIGS. 5–8, for simplicity of illustration, the system for controlling the temperature of the rare earth metal is not shown in FIGS. 5–8. Rather, it is to be understood that the temperature of the depicted rare earth metal is controlled by either a temperature control system of the type depicted in FIGS. 1–4 or some other suitable temperature control system. Other suitable temperature control systems will be readily apparent to those skilled in the temperature control arts based on the heretofore and hereinafter descriptions of various rare earth metal switched magnetic devices formed in accordance with this invention.

The rare earth metal switched magnetic clamp 61 illustrated in FIG. 4 includes a magnetic structure 63 similar to the magnetic structure 22*a*illustrated in FIGS. 1–3 and described above. More specifically, the magnetic structure 63 includes first and second permanent magnets 65*a* and 65*b* and a bridge 67. The bridge 67 is preferably formed of soft iron. The main difference between the rare earth metal switched magnetic clamps shown in FIGS. 1–3 and described above and the rare earth metal switched magnetic clamp shown in FIG. 4 relates to the nature of the backing plate. Rather than the backing plate being formed substantially entirely of a rare earth metal or a rare earth metal alloy, the backing plate 69 of the rare earth metal switched magnetic clamp 61 illustrated in FIG. 4 includes a bridge 71 and two rare earth metal components 73*a* and 73*b*. The bridge is preferably formed of soft iron. Rather than being a single element component, the two rare earth metal components 73*a* and 73*b* shown in FIG. 4 are formed of multiple layers 75*a*, 75*b*, 75*c*, and 75*d* each formed of a rare earth metal or a rare earth metal alloy. The rare earth metal components 73*a* and 73*b* are located at opposite ends of the bridge 71 in alignment with the first and second magnets 65*a* and 65*b*.

FIG. 4 is intended to make it clear that the backing plate does not have to be formed entirely or substantially entirely of a rare earth metal or a rare earth metal alloy. FIG. 4 shows that only a portion of the backing plate needs to be formed of a rare earth metal or a rare earth metal alloy. The bridge 71 carries magnetic flux between the rare earth metal components 73*a* and 73*b* just as if the entire backing plate were formed entirely of a rare earth metal or a rare earth metal alloy. The inclusion of the bridge has two advantages. The bridge reduces the size of the mass that must be thermally controlled. A backing plate formed of a soft iron bridge and two rare earth metal elements is substantially less expensive than a backing plate formed entirely of a rare earth metal.

Figure 5:
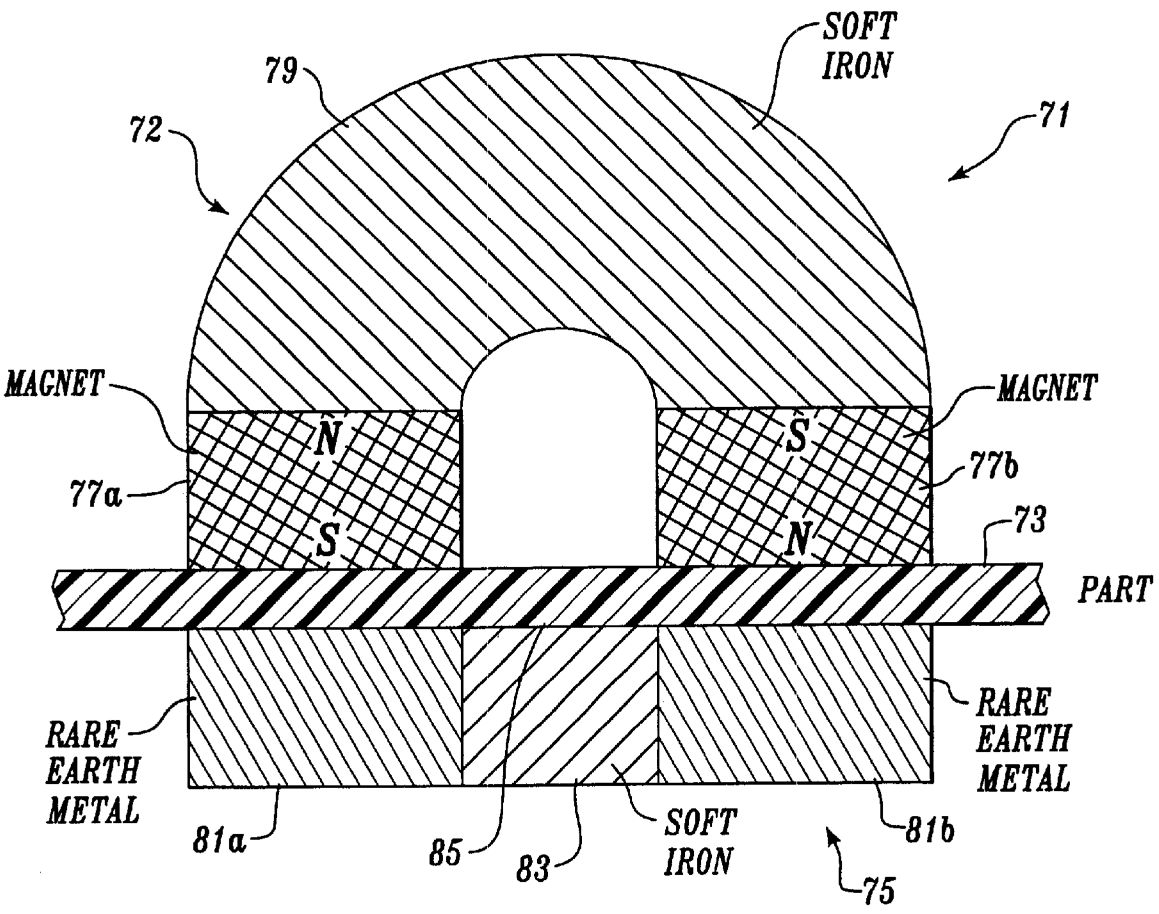
FIG. 5 is yet another alternative embodiment of a rare earth metal switched magnetic clamp formed in accordance with the invention.

FIG. 5 illustrates a further alternative embodiment of a rare earth metal switched magnetic clamp 71 formed in accordance with the invention. Like FIG. 4, the rare earth metal switched magnetic clamp 71 illustrated in FIG. 5 is generally similar to the rare earth metal switched magnetic clamps illustrated in FIGS. 1, 2, and 3 and described above. More specifically, the rare earth metal switched metal clamp 71 illustrated in FIG. 5 comprising a magnetic structure 72 located on one side of a part 73 and a rare earth metal backing plate 75 located on the other side of the part. The magnetic structure 72 includes first and second permanent magnets 77*a* and 77*b*, one pole of which is bridged by a bridge 79, preferably formed of soft iron. Rather than being planar, as in FIGS. 1–4, the bridge 79 is depicted as U-shaped in FIG. 5. Obviously, other shapes can be used in actual embodiments of the invention. One leg of the U-shaped bridge is juxtaposed against one of the poles, i.e., the north (N) pole, of one of the permanent magnets 77*a* and the other leg of the U-shaped bridge is juxtaposed against the opposite pole, i.e., the south (S) pole of the other permanent magnet 77*b*. The other poles of the first and second permanent magnets 77*a* and 77*b* are positioned against one side of the part 73.

The backing plate 75 of the rare earth metal switched magnetic clamp shown in FIG. 5 includes two rare earth metal components 81*a* and 81*b* and a ferromagnetic component 83. The ferromagnetic component is preferably formed of soft iron. The ferromagnetic component 83 is located between the first and second rare earth metal components 81*a* and 81*b*. That is, rather than bridging two rare earth metal components 81*a* and 81*b*, as in FIG. 4, the ferromagnetic component 83 is located between the two rare earth metal components 81*a* and 81*b*. The rare earth metal components 81*a* and 81*b* and the ferromagnetic component 83 define a common plane that is juxtaposed against the part 73 on the side thereof opposite the side on which the magnetic structure 71 is located, in alignment therewith.

As will be readily appreciated from the foregoing description, FIGS. 1–5 show a variety of rare earth metal switched magnetic clamps formed in accordance with the invention. Obviously, various modification of the illustrated structures can be envisioned, all of which fall within the spirit and scope of the invention. For example, rather than utilizing two permanent magnets, a single permanent magnet having a generally U-shape, or a permanent magnet having a planar shape and a pair of ferromagnetic pole elements located where the permanent magnets are depicted in FIGS. 1–5 can be utilized, if desired. Further, other combinations of rare earth metal components and ferromagnetic components can be used to form the backing plate. Hence, the rare earth metal switched magnetic clamps depicted in these figures should be construed as exemplary and not as limiting.

Figure 6:
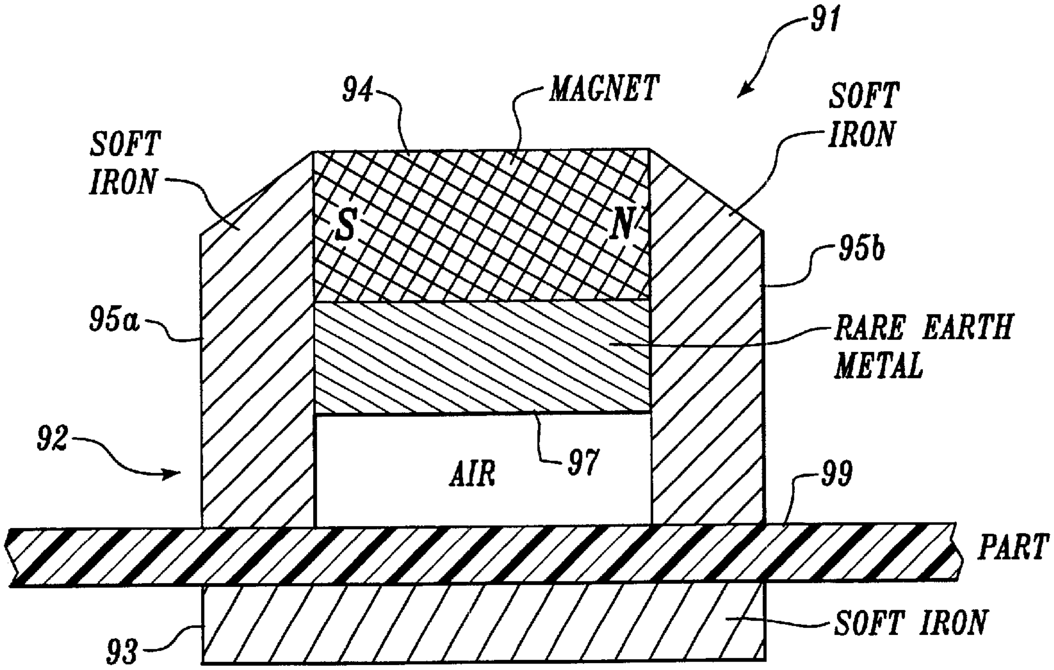
FIG. 6 is a still further alternative embodiment of a rare earth metal switched magnetic clamp formed in accordance with the invention.

FIG. 6 illustrates an alternative type of rare earth metal switched magnetic clamp 91 formed in accordance with the invention. The rare earth metal switched magnetic clamp 91 illustrated in FIG. 6 comprises a magnetic structure 92 and a backing plate 93. The magnetic structure 92 includes a single permanent magnet 94, a pair of ferromagnetic poles 95*a* and 95*b* and a rare earth metal shunt 97. The backing plate 93 is formed of a ferromagnetic material, preferably soft iron. The permanent magnet 94 is elongate and the ferromagnetic poles 95*a* and 95*b* are located at opposite ends of the elongate permanent magnet and are juxtaposed against the north (N) and south (S) poles of the permanent magnet 94. The ferromagnetic poles 95*a* and 95*b* extend orthogonally outwardly from the ends of the permanent magnet 94, creating a generally U-shaped structure. The rare earth metal shunt 97 is located between the ferromagnetic poles 95*a* and 95*b* adjacent the side of the elongate permanent magnet 94. The outer ends of the ferromagnetic poles 95*a* and 95*b* are positioned against one side of a part 99 to be gripped by the rare earth metal switched magnetic ferromagnetic clamp 91. The backing plate 93 is located on the other side of the part 99 in alignment with the magnetic structure 92 formed by the permanent magnet 24, the ferromagnetic poles 95*a* and 95*b*, and the rare earth metal shunt 97.

In operation, as with the previously described rare earth metal switched magnetic clamps formed in accordance with the invention, the temperature of the rare earth metal shunt 97 is controlled by a temperature control system (not shown). Examples of suitable temperature control systems are depicted in FIGS. 1–4 and described above. The temperature control system controls the temperature of the rare earth metal shunt 97 such that the temperature of the rare earth metal shunt is either above or below the Curie temperature of the rare earth metal or rare earth metal alloy used to form the rare earth metal shunt 97. When below the Curie temperature, the rare earth metal shunt 97 shunts the magnetic field produced by the elongate permanent magnet 94, minimizing the magnetic attraction between the ferromagnetic poles 95*a* and 95*b* and the backing plate 93. When the temperature of the rare earth metal shunt 97 is raised above the Curie temperature of the rare earth metal or rare earth metal alloy forming the shunt, the magnetic path created by the shunt is reduced, if not entirely eliminated. As a result, a strong magnetic attraction force occurs between the ferromagnetic poles 95*a* and 95*b* and the backing plate 97. Thus, when the temperature of the rare earth metal shunt 97 is below the Curie temperature of the rare earth metal or rare earth metal alloy forming the shunt, the rare earth metal switched magnetic clamp 91 depicted in FIG. 6 is switched off. Contrariwise, when the temperature of the shunt is above the Curie temperature of the rare earth metal or rare earth metal alloy forming the shunt, the rare earth metal switched magnetic clamp 91 is switched on.

As will be readily appreciated by those skilled in the art and others, the rare earth metal switched magnetic clamp 91 illustrated in FIG. 6 could also be utilized as a lifter for ferromagnetic, i.e., iron, parts. Such usage eliminates the need for a soft iron backing plate 93, since the ferromagnetic part will perform the function of the backing plate, eliminating the need for such a plate. In operation, prior to attaching such a lifter to a ferromagnetic part, the temperature of the rare earth metal shunt 97 is reduced below the Curie temperature of the rare earth metal or rare earth metal alloy forming the shunt. After the ferromagnetic poles **95*a* and 95*b*** are brought into contact with the ferromagnetic part, the temperature of the shunt is raised above the Curie temperature of the rare earth metal or rare earth metal alloy forming the shunt. When this occurs, the magnetic field created by the permanent magnet will cause the lifter to become strongly attached to the ferromagnetic part. As a result, when the lifter is moved, e.g., raised, either manually or by a mechanical mechanism (not shown), the ferromagnetic part will also be moved.

Figure 7:
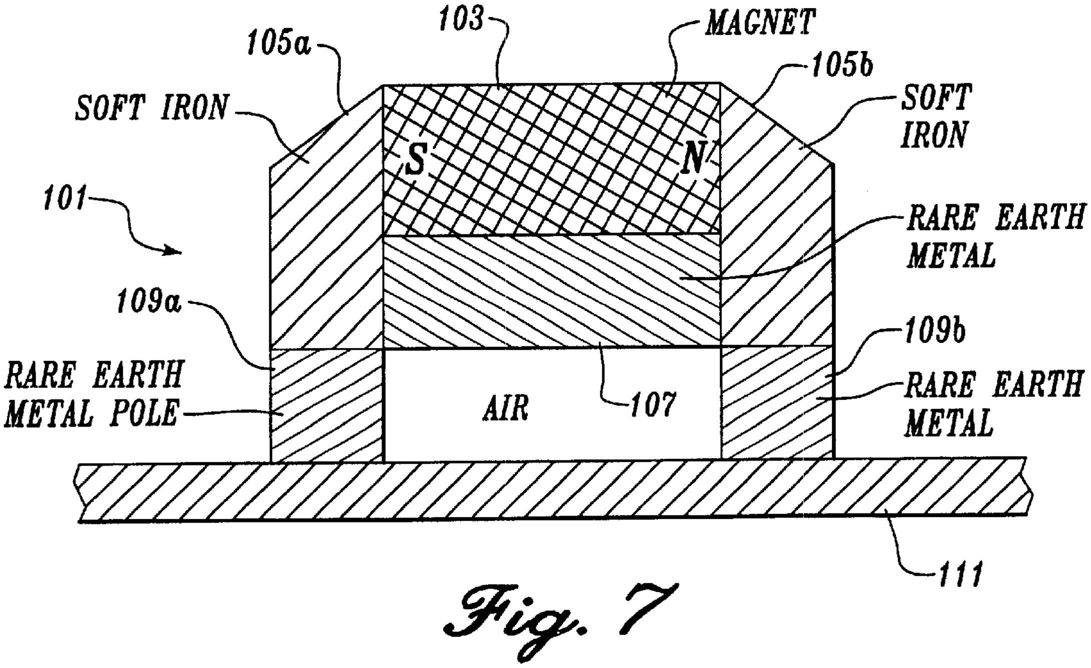
FIG. 7 is a cross-sectional view of a rare earth metal switched magnetic lifter formed in accordance with the invention.

FIG. 7 illustrates a modified version of the lifter generally described above in connection with FIG. 6. More specifically, the lifter 101 illustrated in FIG. 7 includes an elongate permanent magnet 103, a pair of ferromagnetic poles **105*a* and 105*b*, a rare earth metal shunt 107, and two rare earth metal poles 109*a* and 109*b*. As with the embodiment of the invention illustrated in FIG. 6, the ferromagnetic poles 105*a* and 105*b*, protrude orthogonally outwardly from magnetic poles located at opposite ends of the permanent magnet 103. Located between the outwardly extending ferromagnetic poles 105*a* and 105*b*, is the rare earth metal shunt 107. The rare earth metal poles 109*a* and 109*b* are located at the outer ends of the ferromagnetic poles 105*a* and 105*b*. As an alternative to the magnetic structure shown in FIG. 7, the ferromagnetic poles 105*a* and 105*b*, could be formed of a rare earth metal or a rare earth metal alloy either similar to or different from the rare earth metal or rare earth alloy forming the rare earth metal poles 109*a* and 109*b*. If similar, the ferromagnetic poles 105*a* and 105*b*, and the rare earth metal poles 109*a* and 109*b*** may be integrally formed.

As with the lifter illustrated in FIG. 6, in use, the outer ends of the rare earth metal poles **109*a* and 109*b* of the lifter 101 shown in FIG. 7 are positioned against the ferromagnetic, i.e., iron, part 111 to be lifted by the lifter 101 and the temperature of the rare earth metal components of the lifter are controlled to control the attraction force. The inclusion of rare earth metal poles 109*a* and 109*b* in addition to the rare earth metal shunt 107 provides more control and better concentration of the magnetic attraction force applied to the part 111 since the magnetic characteristics of the rare earth metal poles and the rare earth metal shunt can be independently controlled. For example, when the temperature of the rare earth metal shunt is raised above the Curie temperature of the rare earth metal or rare earth metal alloy forming the shunt, the temperature of the rare earth metal poles 109*a* and 109*b* can be reduced below the Curie temperature of the rare earth metal or rare earth metal alloy forming the rare earth metal poles to increase the concentration of the magnetic flux and, thus, increase the magnetic force applied to the part 111. Alternatively, as before, the temperature of the rare earth metal shunt can be reduced below the Curie temperature of the rare earth metal or rare earth metal alloy forming the shunt to switch the lifter off. At the same time, the temperature of the rare earth metal poles can be raised above the Curie temperature of the rare earth metal or rare earth metal alloy forming the rare earth metal pole to further reduce the attraction force between the lifter 101 and the part 111. As a result, enhanced on and off operation is provided by the lifter 101 illustrated in FIG. 7 when compared to a lifter version of the clamp illustrated in FIG. 6**.

Figure 8:
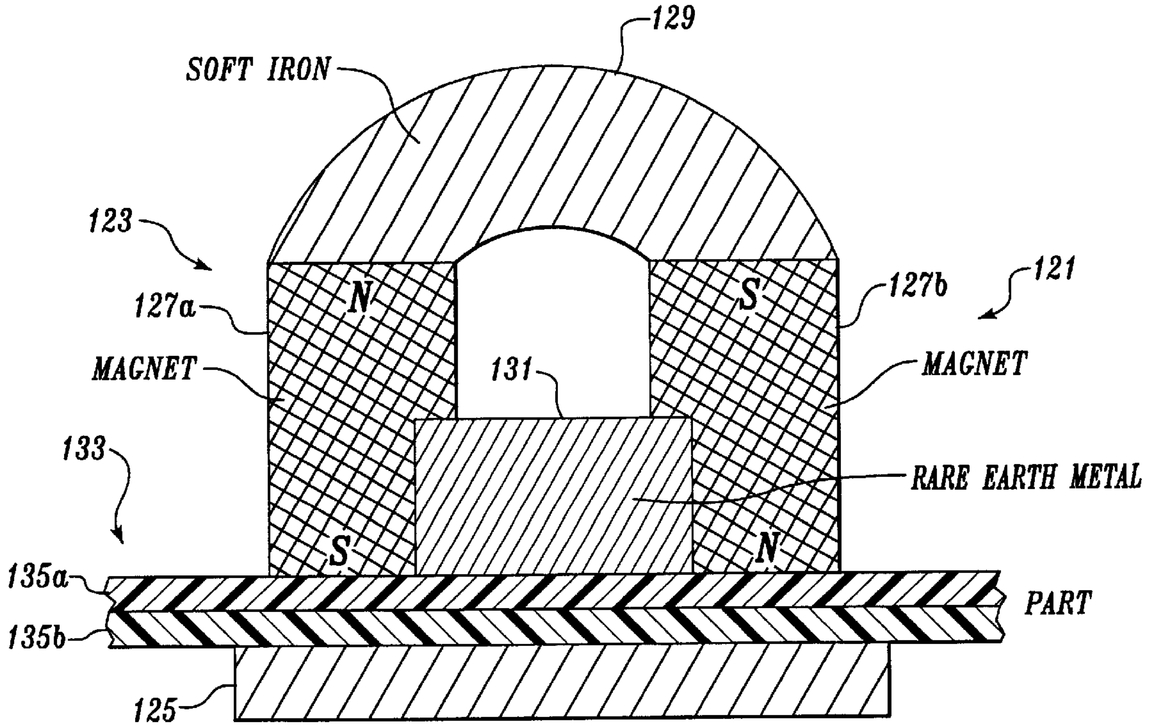
FIG. 8 is an alternative embodiment of a rare earth metal switched magnetic lifter formed in accordance with the invention.

FIG. 8 illustrates yet another rare earth metal switched magnetic lifter 121 formed in accordance with the invention. Like the rare earth metal switched magnetic clamps illustrated in FIGS. 1–6 and described above, the rare earth metal switched magnetic lifter 121 illustrated in FIG. 8 includes a magnetic structure 123 and a backing plate 126. Thus, the lifter 121 could also be used as a clamp. The magnetic structure 123 comprises first and second permanent magnets **127 *a* and 127*b*, a bridge 129, and a rare earth metal shunt 131. The bridge 129 is formed of a ferromagnetic material, preferably soft iron. As with the rare earth metal switched magnetic clamps illustrated in FIGS. 1–5 and described above, the bridge 129 bridges opposite poles of the two permanent magnets 127 *a* and 127*b*. The bridge is depicted as somewhat U-shaped with one end of the U-shape juxtaposed against the north pole of one of the permanent magnets 127 *a* and the other leg of the U-shape juxtaposed against the south pole of the other permanent magnet 127*b*. The rare earth metal shunt 131 is bridged across the other poles of the first and second permanent magnets 127*a* and 127*b*, i.e., the rare earth metal shunt 131 extends between the south pole of one of the permanent magnets 127*a* and the north pole of the other permanent magnet 127*b*. The poles of the permanent magnet 127*a* and 127*b* bridged by the rare earth metal shunt 131 and one side of the rare earth metal shunt 131 lie in a common plane that is positioned against one side of a part 133 to be lifted. The illustrated part is formed of two components 135*a* and 135*b*, which may be formed of a non-metallic material or a non-ferromagnetic metal. The backing plate 125 is located on the opposite side of the part 133 from the magnetic structure 123 in alignment therewith. Thus, the part 133 is located between the magnetic structure 123 and the backing plate 125**.

As with previously described embodiments of the invention, the rare earth metal switch magnetic lifter illustrated in FIG. 8 is switched on and off by controlling the temperature of the rare earth metal shunt 131. When the temperature of the rare earth metal shunt 131 is reduced below the Curie temperature of the rare earth metal or rare earth metal alloy forming the rare earth metal shunt, the magnetic structure 123 is switched off because the majority of the magnetic flux between the south pole of the first permanent magnet **127*a* and the north pole of the second permanent magnet 127*b* passes through the rare earth metal shunt 131. When the temperature of the shunt is raised above the Curie temperature of the rare earth metal or rare earth metal alloy forming the shunt 131, the magnetic structure 123 is switched on. When switched on, the majority of the magnetic flux between the south pole of the first permanent magnet 127*a* of the north pole and the second permanent magnet 127*b* passes through the part and the backup plate 125 causing a strong clamping force to exist between the south pole of the first permanent magnet 127*a* and the backing plate 125 and between the north pole of the second permanent magnet 127*b* and the backing plate 125. As a result, when the magnetic structure 123 is moved, i.e., lifted, the part 133 is also moved. As noted above, the lifter 121** can also be used as a clamp.

Figure 9:
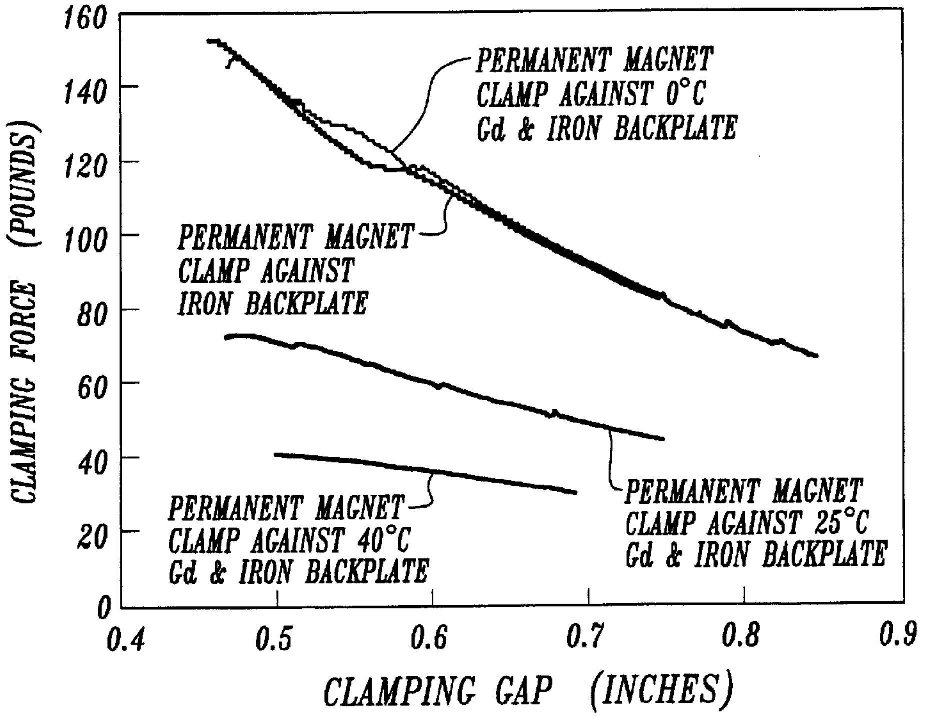
FIG. 9 is a graph that illustrates clamping force versus clamping gap for rare earth metal switched magnetic clamps or lifters formed in accordance with the invention.

FIG. 9 is an exemplary graph of clamping force versus clamping gap for a permanent magnet clamp and gadolinium (Gd) and iron alloy backplate combination at various degrees Centigrade. Zero (0°) degrees, twenty-five (25°) degrees, and forty (40°) degrees Centigrade are shown. As illustrated, the clamping force drops dramatically as the temperature of the Gd and iron backplate is raised. For purposes of comparison, the forced produced by a permanent magnet clamp and iron backplate combination is also depicted. As shown, the magnetic attraction force of a permanent magnet clamp and iron backplate combination and a permanent magnet clamp and Gd and iron backplate at 0° C. are substantially the same. However, as the temperature of the Gd and iron backplate is raised, the clamping force drops off dramatically. As a result, ease of clamp removal is substantially improved using a Gd and iron backplate as it compares to an iron backplate for the same permanent magnetic clamp. The graph also depicts that clamping force drops as a clamping gap increases, i.e., as the distance between the magnetic structure and the backplate increases.

FIGS. 10A, 10B, 11, and 12 illustrate a rare earth metal switched magnetic riveter 151 formed in accordance with the invention. The illustrated rare earth metal switched magnetic riveter 151 includes a driver 153 and movable head 155. The driver 153 includes a cup-shaped magnet housing 157, a cylindrically shaped permanent magnet 159, a rare earth metal wall 161, and a Peltier heater/cooler 163. The cup-shaped magnet housing 157 is formed of a ferromagnetic material, preferably soft iron. The cylindrically shaped permanent magnet 159 has poles located at the opposite ends thereof. One of the poles, i.e., the north (N) pole, is juxtaposed against the bottom of the cup-shaped magnet housing 157. As a result, the cup 157 forms a ferromagnetic pole for the cylindrically shaped permanent magnet 159, making the rim of the cup north (N) as shown in FIGS. 10A and 10B. The cylindrically shaped permanent magnet 159 is sized such that the south (S) pole of the permanent magnet 159 lies coplanar with the rim of the cup 157.

The rare earth metal wall 161 is juxtaposed against the south pole of the cylindrically shaped permanent magnet 159 and the rim of the cup 157. The rare earth metal wall 161 extends outwardly from the edge of the cup 157. The periphery of the rare earth metal wall 161 extends into the Peltier heater/cooler 163. More specifically, the Peltier heater/cooler 163 includes a cylindrical housing 165 that surrounds the cup 157. A plurality of Peltier elements 167 are mounted on both sides of the rare earth metal wall 161 so as to be in heat transmission relationship therewith. The Peltier heater/cooler housing 165 includes an air inlet 169 and an air outlet 171. The housing 165 also includes an inlet manifold 173, an outlet manifold 175, a plurality of inlet baffles 177, and a plurality of outlet baffles 179. The air inlet 169 is in communication with the inlet manifold 173. The inlet manifold 173 includes an apertured plate 181, which is mounted in the housing 165. The apertured plate includes a plurality of apertures that direct air from the inlet manifold 173 toward the inlet baffles 177. The inlet baffles direct air to the Peltier heater/cooler elements 167. The outlet baffles 179 direct air from the Peltier elements to a second apertured plate 183. The second apertured plate is mounted in the housing 165 and forms part of the outlet manifold 175. The apertures of the second apertured plate 183 direct air into the outlet manifold 175. Air exits the outlet manifold 175 via the air outlet 171. Thus, the housing 165 provides a mechanism for circulating pressurized air received at the air inlet around the Peltier elements 167.

The movable head 155 of the rare earth metal switched magnetic riveter 151 illustrated in FIGS. 10A, 10B, 11, and 12 includes a hammer 185. The hammer 185 has a large mass and includes a cup-shaped portion 187 and a conical-shaped portion 189. Preferably, the cup-shaped portion 187 and the conical-shaped portion 189 are integrally formed with one another. If so, the integral combination is formed of a ferromagnetic material, preferably soft iron. Alternatively, the cup-shaped portion 187 and the conical-shaped portion 189 may be separate elements. In this case, at least the cup-shaped portion 187 must be formed of a ferromagnetic material, e.g., soft iron. The cup-shaped portion 187 is generally similar in shape and size to the cup-shaped magnetic housing 157 of the driver 153 of the rare earth metal switched magnetic riveter 151. The rim of the cup-shaped portion 187 is aligned with the rim of the cup-shaped magnetic housing 157. Thus, the interior of the cup-shaped portion 187 faces the interior of the cup-shaped magnetic housing 157.

Mounted in the cup-shaped portion 187 is a permanent magnet 191. Like the permanent magnet 159 mounted in the cup-shaped magnetic housing 157, the permanent magnet 191 mounted in the cup-shaped portion 187 is, preferably, cylindrical. The permanent magnet 191 mounted in the cup-shaped portion 187 is oriented such that the same pole of the two permanent magnets 159 and 191 face one another. The south (S) pole of the magnets face one another in the exemplary embodiment of a rare earth metal switched magnetic riveter formed in accordance with the invention shown in FIGS. 10A, 10B, 11, and 12. As a result, the rim of the cup-shaped portion 187, like the rim of the cup-shaped magnetic housing 157 has a north (N) pole magnetic polarity.

The conical-shaped portion 189 of the hammer 185 tapers outwardly from the base of the cup-shaped portion 187 and terminates at a tip 193. The end of the tip 193 is hardened or includes a hardened component 195.

The hardened component 195, located at the tip 193 of the conical-shaped portion 189 of the hammer 185 is aligned with a rivet 197 that extends through a part 199 formed of two layers 201*a* and 201*b*. Located on the opposite side of the part 199 from the rare earth metal switched magnet riveter 151 is a backing plate 203.

In operation, the Peltier elements 167 control the temperature of the rare earth metal wall 161. When the Peltier elements reduce temperature of the rare earth metal wall below the Curie temperature of the rare earth metal or rare earth metal alloy forming the rare earth metal wall, the rivet head 185 is in the retracted position illustrated in FIG. 10A More specifically, as shown in FIG. 12, when the temperature of the wall 161 lies below the Curie temperature of the rare earth metal or rare earth metal alloy forming the wall, the wall creates a magnetic shunt that inhibits the repulsive effect of the two permanent magnets 159 and 187. The wall 161 provides a high-capacity magnetic path between the south pole of the permanent magnet 159 mounted in the cup-shaped magnetic housing 157 and the north pole created by this permanent magnet at the rim of the cup-shaped magnetic housing. The rare earth metal wall 161 also provides a high-capacity magnet path between the south pole of the permanent magnet 191 mounted in the cup-shaped portion 187 and the north pole created by this magnet at the rim of the cup-shaped portion. As a result, the aligned, similar polarity magnetic poles do not repel one another. In contrast, when the Peltier elements raise the temperature of the rare earth metal wall 161 above the Curie temperature of the rare earth metal or rare earth metal alloy forming the wall, the magnetic shunt created by the wall is eliminated, resulting in the previously described magnetic poles repelling one another. The repelling force drives the hammer 185 toward the rivet 197, resulting in the rivet 197 being upset, i.e., a head being formed, by the hardened section 195 of the hammer 185.

Figure 13A:
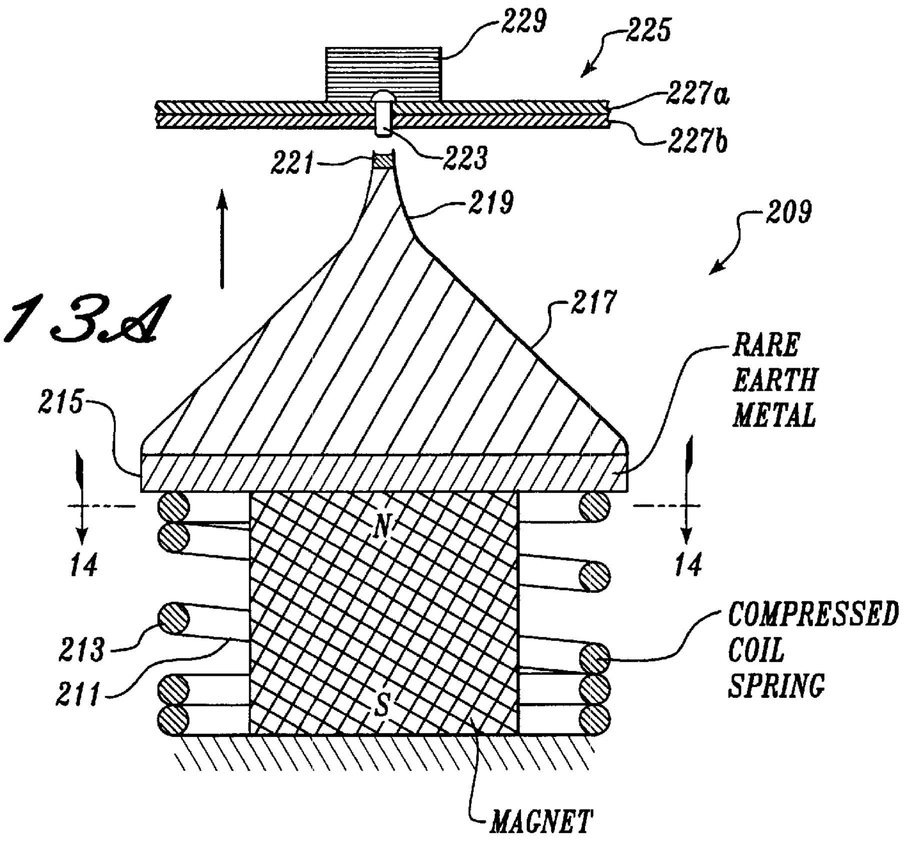
FIG. 13A is a cross-sectional view of an alternative embodiment of a rare earth metal switched magnetic riveter formed in accordance with the invention in the retracted position taken along line 13A—13A of FIG. 14.
Figure 13B:
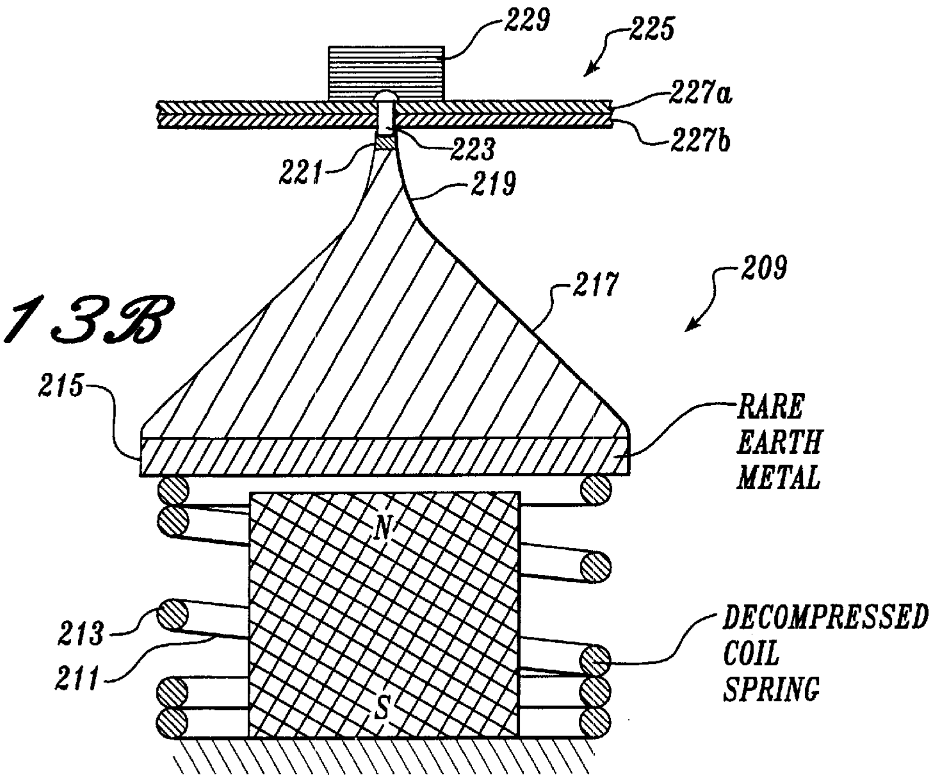
FIG. 13B is a cross-sectional view of the alternative rare earth metal switched magnetic riveter shown in FIG. 13A in the rivet upset position.
Figure 14:
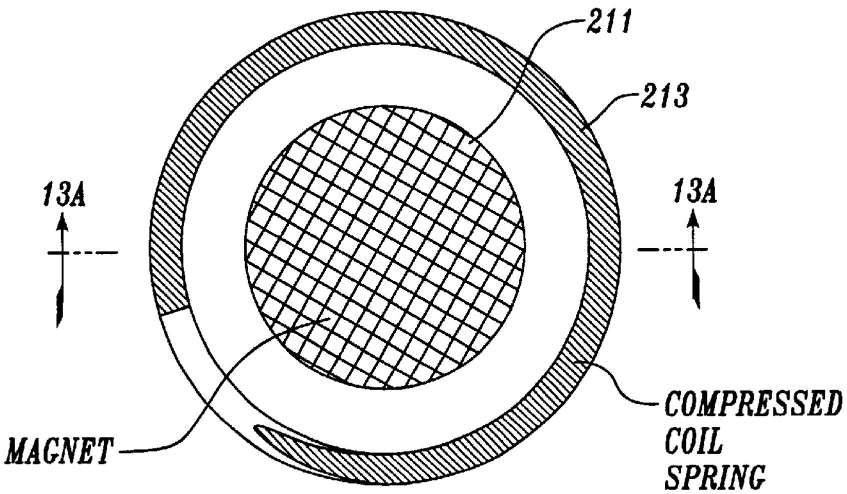
FIG. 14 is a cross-sectional view along line 14—14 of FIG. 13A.

FIG. 13A, 13B, and 14 illustrate an alternative embodiment of a rare earth metal switched magnetic riveter formed in accordance with the invention. The rare earth metal switch magnetic riveter illustrated in FIGS. 13A, 13B, and 14 includes a permanent magnet 211, a coil spring 213, a rare earth metal plate 215, and a hammer 217. Preferably, the magnet 211 has a cylindrical shape. One pole, illustrated as the south (S) pole of the magnet 211 is rigidly supported. The coil spring 213 surrounds the magnet 211. One end of the coil spring 213 is juxtaposed against the rigid support structure. The rare earth metal plate 215 overlies the other end of the coil spring and the other pole, i.e., the north (N) pole, of the permanent magnet. The length of the coil spring is such that the coil spring is compressed when the rare earth metal plate 215 is juxtaposed against the north pole of the permanent magnet 211. Located on the other side of the rare earth metal plate 215 from the permanent magnet 211 is the hammer 217. The hammer 217 has a conical shape that terminates in a tip 219. A hardened element 221 is located at the end of the tip 219. Alternatively, the entire hammer 217 may be formed of a hardened material, e.g., a metal hard enough to be used to upset a rivet. The tip 219 is aligned with a rivet 223 illustrated as passing through a part 225 formed of two layers 227*a* and 227*b* . Located on the opposite side of the part 225 from the hammer 217 is a backing plate 229.

The temperature of the rare earth metal plate 215 is controlled by a suitable temperature control mechanism such as the mechanism shown in FIGS. 1, 2, 3, 10A, 10B, and 11 and described above. When the temperature of the rare earth metal plate 215 is reduced below the Curie temperature of the rare earth metal or rare earth metal alloy forming the rare earth metal plate 215, the rare earth metal plate 215 is attracted to and pulled against the adjacent (north) pole of the permanent magnet 211, compressing the coil spring 213, as illustrated in FIG. 13A. When the temperature of the rare earth metal plate 215 is raised above the Curie temperature of the rare earth metal or rare earth metal alloy forming the rare earth metal plate, the magnetic attraction force is eliminated, resulting in the coil spring 213 decompressing. Decompression of the coil spring 213 drives the tip 219 of the hammer 217 against the rivet 223, upsetting the rivet, as shown in FIG. 13B.

Figure 15:
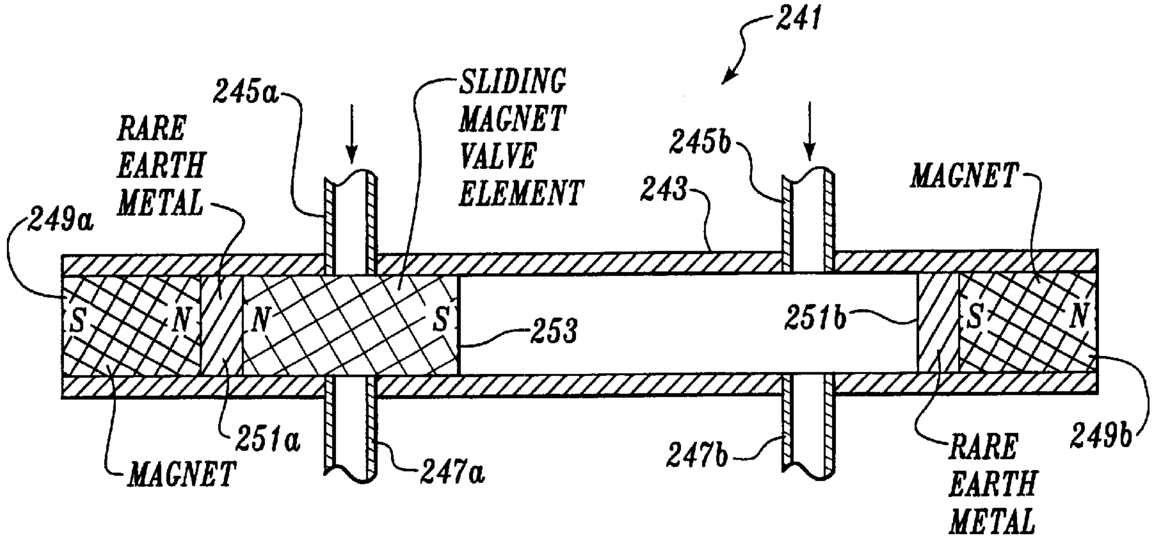
FIG. 15 is a cross-sectional view of a rare earth metal switched magnetic valve formed in accordance with the invention.

FIG. 15 illustrates a rare earth metal switched magnetic valve 241 formed in accordance with the invention. The illustrated rare earth metal switched magnetic valve 241 illustrated in FIG. 15 is a dual inlet/outlet valve wherein the position of a movable element determines which inlet/outlet set is open and which inlet/outlet set is closed. More specifically, the rare earth metal switched magnetic valve 241 illustrated in FIG. 15 includes a cylindrical housing 243, two inlets 245*a* and 245*b*, two outlets 247*a* and 247*b*, two cylindrical permanent magnets 249*a* and 249*b*, two rare earth metal walls 251*a* and 251*b*, and a slidable magnetic valve element 253.

The two cylindrical permanent magnets 249*a* and 249*b* are located at opposite ends of the cylindrical housing 253. Opposite poles of the permanent magnets 249*a* and 249*b* face one another. That is, the two cylindrical permanent magnets 249*a* and 249*b* are positioned in housing 243 such that the inwardly facing poles are of opposite polarity, i.e., the north pole of one magnet 249*a* points inwardly and the south pole of the other magnet 249*b* points inwardly.

Mounted in the housing 243 adjacent the inner poles of the cylindrical permanent magnets 249*a* and 249*b* are the rare earth metal walls 251*a* and 251*b*. More specifically, one of the rare earth metal walls 251*a* is juxtaposed against the inner (north) pole of one of the cylindrical permanent magnets 249*a*, and the other rare earth metal wall 251*b* is juxtaposed against the inner (south) pole of the other cylindrical permanent magnet 249*b*.

The slidable magnetic valve element 253 is mounted in the housing 243 between the rare earth metal walls 251*a* and 251*b*. The north/south poles of the slidable magnetic valve element are located at opposite ends thereof. Thus, the north pole of the slidable magnetic valve element faces one of the rare earth metal walls 251*a*, and the south pole faces the other rare earth metal wall 251*b*. The orientation of the slidable magnetic valve element 253 is such that the poles of the slidable magnetic valve element 253 face poles of similar polarity of the two cylindrical permanent magnets 249*a* and 249*b*.

One inlet 245*a* is located near, but inwardly of, one of the rare earth metal walls 251*a*. The other inlet 245*b* is located near, but inwardly, of the other rare earth metal wall 251*b*. One of the outlets 247*a* is aligned with one of the inlets 245*a*, and the other outlets 247*b* is aligned with the other inlet 245*b*. The sliding valve element 253 is sized such that when positioned adjacent one or the other of the rare earth metal walls 251*a* or 251*b*, it closes off the interior space of the housing 243 located between the inlet and outlet adjacent that wall.

The temperature of the rare earth metal walls 251*a* and 251*b* is controlled by suitable temperature control mechanisms such as that illustrated in FIGS. 1, 2, or 3, and described above.

In operation, when the temperature control mechanism associated with either of the rare earth metal walls 251*a* or 251*b* reduces the temperature of the rare earth metal wall below the Curie temperature of the rare earth metal or the rare earth metal alloy forming the rare earth metal wall, the rare earth metal wall shunts the magnetic field produced by the adjacent cylindrical permanent magnet 251*a* or 251*b* allowing the slidable magnetic valve element 253 to move near to that rare earth metal wall. Contrariwise, when the temperature control mechanism associated with either of the rare earth metal walls 251*a* or 251*b* raises the temperature of the rare earth magnetic wall above the Curie temperature of the rare earth metal or rare earth metal alloy forming the rare earth metal wall, the magnetic field produced by the adjacent cylindrical permanent magnet 249*a* or 249*b* repels the slidable magnetic valve element causing the slidable magnetic element to move away from the rare earth metal wall. This repulsion effect is used to position the slidable magnetic valve element in the desired position, at either end of the interior of the cylindrical housing 243. At one end, the slidable magnetic element blocks one of the inlets from the related outlet. When the slidable magnetic element is positioned in one inlet/outlet blocking position, the other inlets/outlets are in fluid communication.

The positioning of the slidable magnetic valve element 253 is preferably accomplished by lowering the temperature of one of the rare earth metal walls below the Curie temperature of the rare earth metal or the rare earth metal alloy forming the rare earth metal wall, and raising the temperature of the other rare earth metal wall above the Curie temperature of the rare earth metal or rare earth metal alloy forming the other rare earth metal wall 251*b*. Reversing the Curie temperature status of the rare earth metal walls 251*a* and 251*b* causes the slidable magnetic valve element to move into the opposite end of the cylindrical housing 243.

Such movement closes the other inlet/outlet and opens the first inlet/outlet.

As will be readily appreciated from the foregoing description, FIG. 15 is exemplary of a wide variety of rare earth metal switched magnetic valves that can be formed utilizing the invention, including spring loaded valves. Such valves include single inlet/outlet valves, as well as dual inlet/outlet valves of the type illustrated in FIG. 15 and described above.

Figure 16:
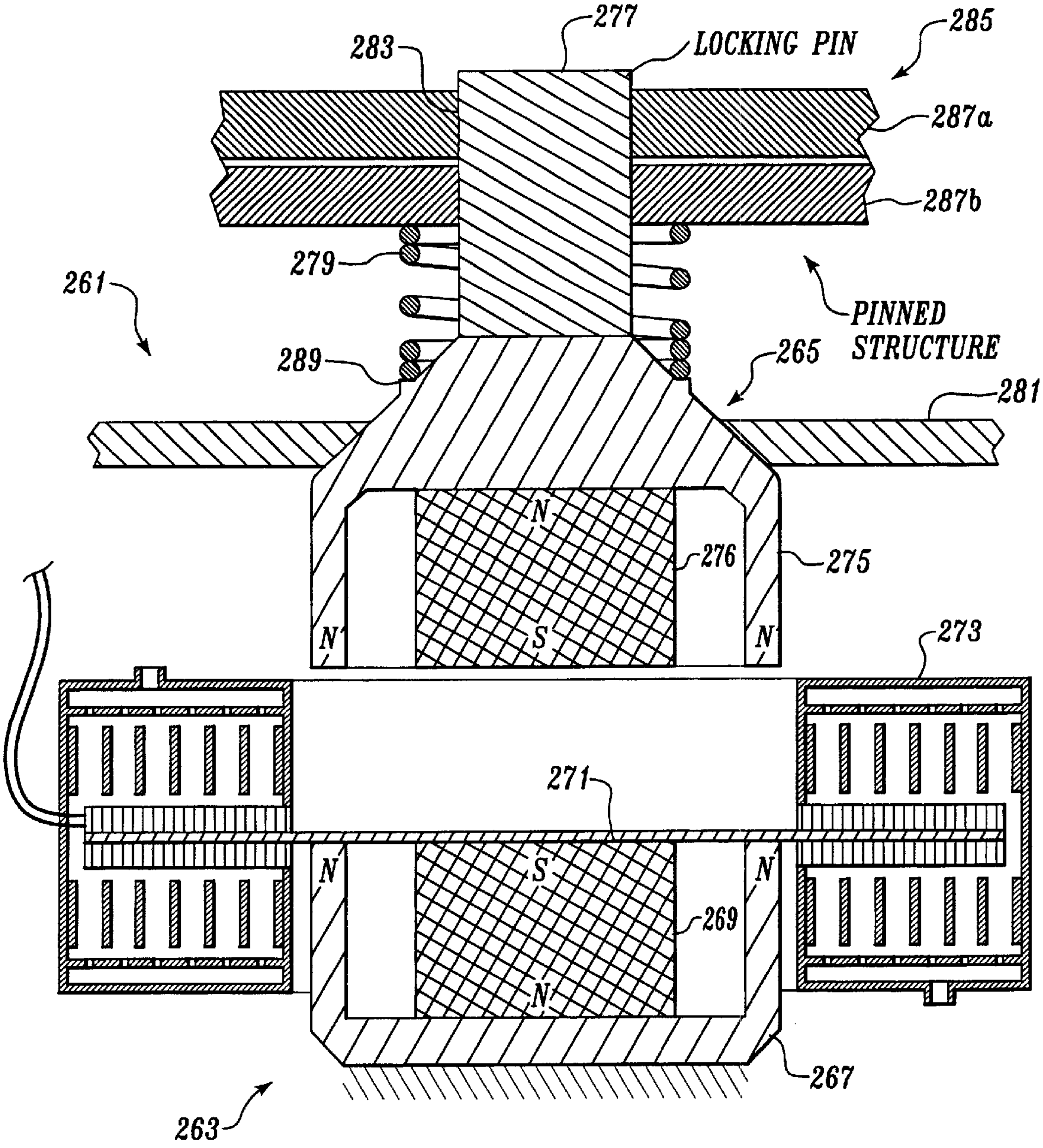
FIG. 16 is a cross-sectional view of a rare earth metal switched magnetic latch formed in accordance with the invention.

FIG. 16 illustrates a rare earth metal switched magnetic latching mechanism formed in accordance with the invention. The rare earth metal switched magnetic latching mechanism 261 illustrated in FIG. 16 is similar in many respects to the rare earth metal switched magnetic riveter illustrated in FIG. 10A, 10B, 11, and 12, and described above except that the repulsion force produced is substantially less. As with the riveter, the rare earth metal switched magnetic latch 261 illustrated in FIG. 16 includes a stationary section 263 and a movable section 265. The stationary section 263 includes a cup-shaped housing 267, a permanent magnet 269, a rare earth metal wall 271, and a Peltier heater/cooler system 273.

The permanent magnet 269 is positioned in the interior of the cup-shaped housing 267. The permanent magnet 269 is oriented such that one of the poles, i.e., the north pole, is positioned against the base of the cup-shaped housing 267. The cup-shaped housing 267 is formed of a ferromagnetic material, e.g., soft iron, whereby the rim of the stationary cup has a north polarity. The rim of the cup-shaped housing 267 is coplanar with the other pole, i.e., the south pole, of the permanent magnet 269. The rare earth metal wall 271 is juxtaposed against the latter pole of the permanent magnet 261 and against the rim of the cup-shaped housing 267. The rare earth metal wall 271 extends beyond the periphery of the lip of the cup 267.

Mounted on the periphery of the rare earth metal wall 271 is the Peltier heater/cooler system 273. Since the Peltier heater/cooler system 273 included in the rare earth metal switched magnetic latch shown in FIG. 16 is generally similar to the Peltier heater/cooler 163 included in the rare earth metal switched magnetic riveter illustrated in FIGS. 10A, 10B, 11, and 12, in order to avoid unnecessary repetitive descriptive material, it is not described further here.

The movable section 265 of the rare earth metal switched magnetic latch 271 illustrated in FIG. 16 includes a cup-shaped element 275, a permanent magnet 276, a locking pin 277, a coil spring 279, and a stop plate 281. The permanent magnet 276 is mounted in the interior of the cup-shaped element 275. One of the poles, namely, the north pole, of the permanent magnet 276 is juxtaposed against the bottom surface of the cup-shaped element 275. The cup-shaped element 275 is formed of a ferromagnetic material, such as soft iron, whereby the rim of the cup-shaped element has the same magnetic polarity, i.e., north, as the pole of the permanent magnet 276 juxtaposed against the bottom of the cup-shaped element 275. The rim of the cup-shaped element 275 is coplanar with the other pole, i.e., the south pole of the permanent magnet 276. The base of the cup-shaped housing 275 is conical and passes through a similar shaped opening in the stop wall 281. The locking pin, preferably, has a cylindrical shape. One end thereof is formed integrally with or attached to the base of the cup-shaped housing 275. The locking pin 277 is aligned with a hole 283 in the structure to be pinned 285. The structure to be pinned 285 is depicted as a pair of plates 287*a* and 287*b*. The coil spring 279 extends between one of the plates 287*b* and a shoulder 289 located about the periphery of the conical-shaped base of the cup-shaped housing 275.

In operation, when the temperature of the rare earth wall 271 is reduced below the Curie temperature of the rare earth metal or rare earth metal alloy forming the rare earth metal wall, the rare earth metal wall shunts the magnetic flux produced by the two permanent magnets 269 and 276, preventing the permanent magnets from creating a repelling force. As a result, the coil spring 279 moves the locking pin 277 out of the hole 283 in the structure to be pinned 285. When the Peltier heating/cooling mechanism 273 raises the temperature of the rare earth metal wall 271 above the Curie temperature of the rare earth metal or rare earth metal alloy forming the wall, the shunt effect is eliminated allowing the permanent magnets to create a repelling force. The repelling force moves the movable section 265 away from the stationary section 263. As the movable section 265 moves into the position shown in FIG. 16, the locking pin 277 enters the hole 283 in the structure to be pinned 285, latching the two plates 287*a* and 287*b* together.

The rare earth metal switched magnetic latch illustrated in FIG. 16 and described above should be considered as exemplary, not limiting. Obviously, other latching mechanisms employing a rare earth metal plate or wall fall within the scope of the invention. For example, the rare earth metal switched magnetic riveter mechanism depicted in FIGS. 13A, 13B, and 14 can be implemented in a latch as can the rare earth metal switched magnetic valve depicted in FIG. 15.

Figure 17:
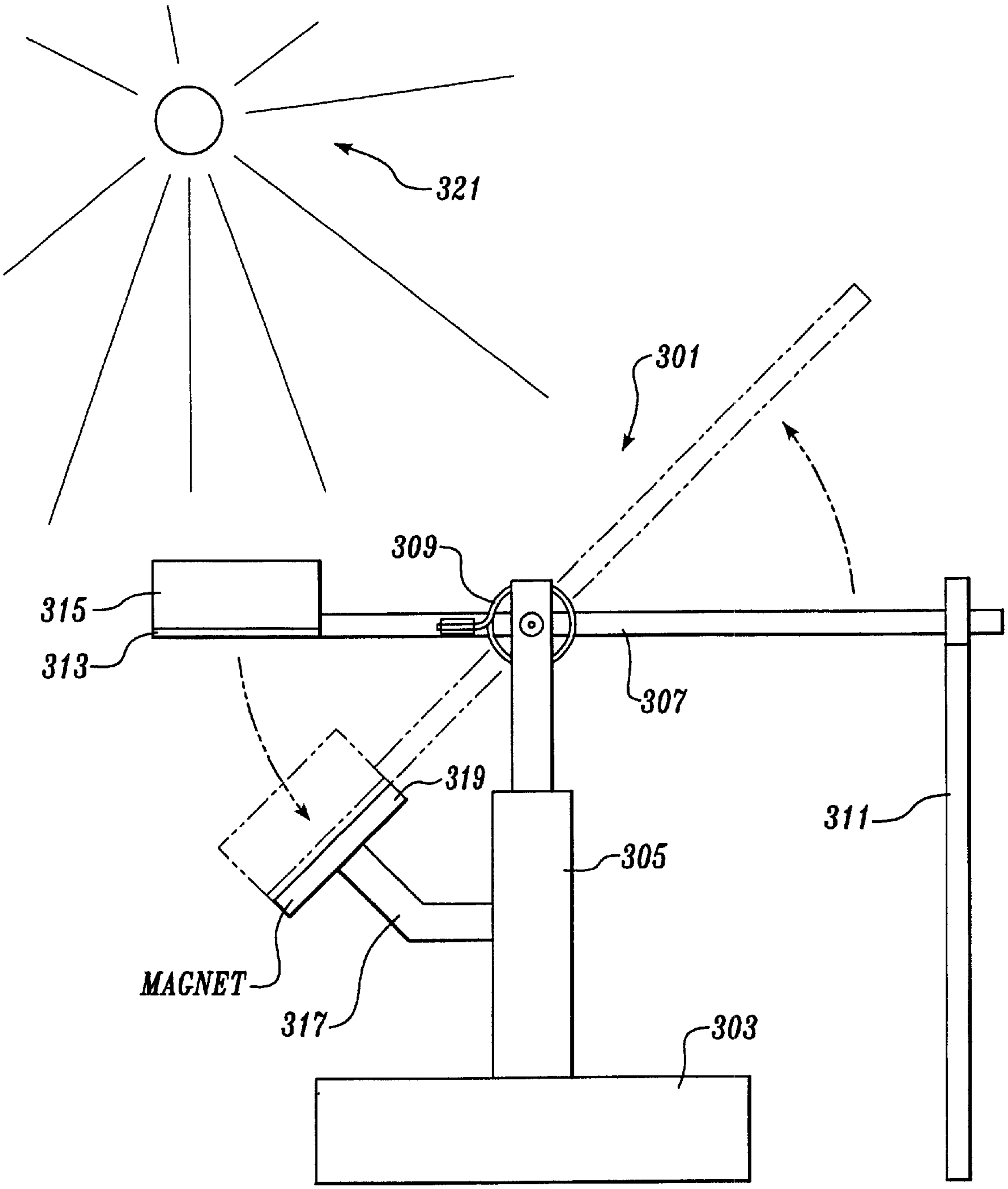
FIG. 17 is a pictorial view of a rare earth metal switched magnetic actuator formed in accordance with the invention.

FIG. 17 illustrates a rare earth metal switched magnetic actuator 301 formed in accordance with the invention. The rare earth metal switched magnetic actuator 301 illustrated in FIG. 17 should be construed as exemplary, not limiting. The rare earth metal switched magnetic actuator 301 illustrated in FIG. 17 includes a base 303 having an upwardly protruding mast 305. Rotatably mounted atop the mast 305 is a lever arm 307. Wrapped around the lever arm 307 is a torsion spring 309. Mounted on one end of the lever arm 309 is a link 311. Mounted on the other end of the lever arm 307 is a rare earth metal plate 313. Mounted atop the rare earth metal plate 313 is a heat exchanger 315 such as a lensatic light trap aperture heat exchanger. Mounted on an arm 317 extending outwardly from the mast 305 is a magnet 319. The magnet is oriented along an inclined plane and positioned such that the rare earth metal plate 313 can be juxtaposed against the face of the magnet 319 as illustrated by dashed lines in FIG. 17. The sun 321 is depicted as controlling the temperature of the rare earth metal plate 313 via the heat exchanger 315.

In operation during the night, when the temperature of the environment in which the actuator illustrated in FIG. 17 is located drops below the Curie temperature of the rare earth metal or rare earth metal alloy forming the rare earth metal plate 313, the rare earth metal plate 313 is attracted by the magnet 319. In contrast, when the sun 321 heats up the rare earth metal plate such that the temperature of the rare earth metal plate rises above the Curie temperature of the rare earth metal or rare earth metal alloy forming the rare earth metal plate, the magnetic attraction dissipates and the torsion spring 309 rotates the lever arm 307 such that the rare earth magnetic plate 313 moves away from the magnet 317 to the solid line position illustrated in FIG. 17. This action causes the link to move from one position to another creating an actuator action.

It should be understood that FIG. 17 should be construed as exemplary, not limiting. Obviously, the heat exchanger 315 and the sun 321 can be replaced by other types of temperature control mechanisms, such as the temperature control mechanism illustrated in FIGS. 1, 2, 3, 10A, 10B, and 11, and described above, for examples. Further, it is to be understood that various other types of actuator mechanisms employing the invention are contemplated. For example, the valve mechanism illustrated in FIG. 15 and described above can be converted into an actuator mechanism by attaching a shaft to the sliding magnet valve element 253 and extending the shaft outwardly from one end of the housing 243, through one of the rare earth metal plates and the related permanent magnet.

In summary, the rare earth metal switched magnetic devices illustrated in the drawings and described above should be considered as exemplary and not limiting. A wide variety of other devices incorporating one or more magnets, a rare earth metal element positioned in the magnetic field produced by the magnet(s) and a system for controlling the temperature of the rare earth metal element fall within the scope of the present invention. While designed for and ideally suited for use with permanent magnets, particularly high-intensity permanent magnets, it is to be understood that the invention can also be used with electromagnets. Consequently, within the scope of the appended claims, it is to be understood that the invention can be practiced otherwise than as specifically described herein.

The embodiments of the invention in which an exclusive property or privilege is claimed are defined as follows:

1. A riveter for providing an upset force to a rivet, comprising:

(a) opposing magnets having poles arranged to create a repulsive magnetic force;

(b) a rare earth element having a Curie temperature of no more than about 20° C. or less and including gadolinium, terbium, dysprosium, holmium, or a mixture thereof, the rare earth element being positioned between the magnets to capture the magnetic field of at least one magnet when the rare earth element is magnetic and to allow the magnetic field from the magnet to move the shuttle when the rare earth element is paramagnetic;

(c) a temperature controller associated with the rare earth element for transitioning the rare earth element through its Curie temperature to convert the rare earth element between its magnetic and paramagnetic states;

(d) a hammer carried on one the magnet and movable into contact with a rivet to impart the upset force upon converting the rare earth element to its paramagnetic state.

2. The riveter of claim 1 wherein the temperature controller includes a Peltier cooler in contact with the rare earth element, or a circulating refrigerant, or a source of electrical power for inputting current into the rare earth element to heat the rare earth element resistively.

3. A method for imparting an upset force to a rivet, comprising the step of:

controlling a magnetic field in an electromagnetic riveter adapted to move a hammer into contact with the rivet to impart the upset force by positioning in the magnetic field a rare earth element having a Curie temperature of no more than about 20° C. or less and including gadolinium, terbium, dysprosium, holmium, or a mixture thereof in the magnetic field to the rare earth element camping the magnetic field when the rare earth element is magnetic and to allowing the magnetic field from the magnet to move the hammer in contact with the rivet when the rare earth element is paramagnetic.

* * * * *